US008612861B2

(12) United States Patent
Martinez et al.

(10) Patent No.: US 8,612,861 B2
(45) Date of Patent: *Dec. 17, 2013

(54) VIEWPOINT COLLABORATION

(75) Inventors: Anthony Edward Martinez, Spicewood, TX (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1087 days.

This patent is subject to a terminal disclaimer.

(21) Appl. No.: 11/758,368

(22) Filed: Jun. 5, 2007

(65) Prior Publication Data

US 2007/0233797 A1    Oct. 4, 2007

Related U.S. Application Data

(63) Continuation of application No. 10/660,073, filed on Sep. 11, 2003, now Pat. No. 7,269,794.

(51) Int. Cl.
*G06F 3/00* (2006.01)
*G06F 3/048* (2013.01)
*G06F 17/00* (2006.01)

(52) U.S. Cl.
USPC ............ 715/738; 715/230; 715/231; 715/803

(58) Field of Classification Search
USPC ......................................... 715/230, 231, 738
See application file for complete search history.

(56) References Cited

U.S. PATENT DOCUMENTS

| 5,363,475 A | 11/1994 | Baker et al. |
| 5,867,156 A * | 2/1999 | Beard et al. ................... 715/753 |
| 5,877,762 A * | 3/1999 | Young ............................ 715/803 |
| 5,983,190 A | 11/1999 | Trower, II et al. |
| 6,025,827 A | 2/2000 | Bullock et al. |
| 6,154,194 A * | 11/2000 | Singh ............................ 345/661 |
| 6,384,840 B1 | 5/2002 | Frank et al. |
| 6,462,750 B1 | 10/2002 | Plow et al. |
| 6,476,831 B1 | 11/2002 | Wirth et al. |
| 6,556,184 B2 | 4/2003 | Weil et al. |
| 6,573,915 B1 | 6/2003 | Sivan et al. |
| 6,922,693 B1 | 7/2005 | Rubin et al. |

(Continued)

OTHER PUBLICATIONS

TechSmith Snag It, 1990-2002, pp. 1-3.*

(Continued)

*Primary Examiner* — Boris Pesin
*Assistant Examiner* — Matthew Ell
(74) *Attorney, Agent, or Firm* — Yee & Associates, P.C.; Arthur J. Samodovitz

(57) ABSTRACT

A method, apparatus, and computer instructions for managing messages. A viewport is displayed on a display in association with a chat window in which the viewport defines an area on the display. The image is defined as graphical data in the area defined by the viewport to form a selected image in response to a user input to select an image. A marker is placed in a text message in the chat window in which the marker is associated with the selected image.

18 Claims, 25 Drawing Sheets

(56) References Cited

U.S. PATENT DOCUMENTS

| | | | |
|---|---|---|---|
| 6,990,452 B1 | 1/2006 | Ostermann et al. | |
| 7,155,676 B2 | 12/2006 | Land et al. | |
| 7,568,151 B2 * | 7/2009 | Bargeron et al. | 715/231 |
| 7,761,507 B2 * | 7/2010 | Herf et al. | 709/204 |
| 2002/0073111 A1 | 6/2002 | Heyliger | |
| 2002/0126135 A1 * | 9/2002 | Ball et al. | 345/600 |
| 2003/0069004 A1 | 4/2003 | Hamynen et al. | |
| 2003/0069738 A1 | 4/2003 | Casey et al. | |
| 2003/0140103 A1 * | 7/2003 | Szeto et al. | 709/206 |
| 2003/0208543 A1 | 11/2003 | Enete et al. | |
| 2003/0217096 A1 | 11/2003 | McKelvie et al. | |
| 2003/0220905 A1 * | 11/2003 | Amado et al. | 707/1 |
| 2004/0177116 A1 * | 9/2004 | McConn et al. | 709/204 |

OTHER PUBLICATIONS

Screendumps—Microsoft Paint, Version 5.1, Copyright 1981-2001, 7 pages.
Screendumps—Microsoft Outlook, Copyright 1995-1999, 5 pages.
USPTO office action for U.S. Appl. No. 10/660,073 dated Aug. 11, 2006.
USPTO final office action for U.S. Appl. No. 10/660,073 dated Jan. 31, 2007.
USPTO notice of allowance for U.S. Appl. No. 10/660,073 dated May 17, 2007.

* cited by examiner

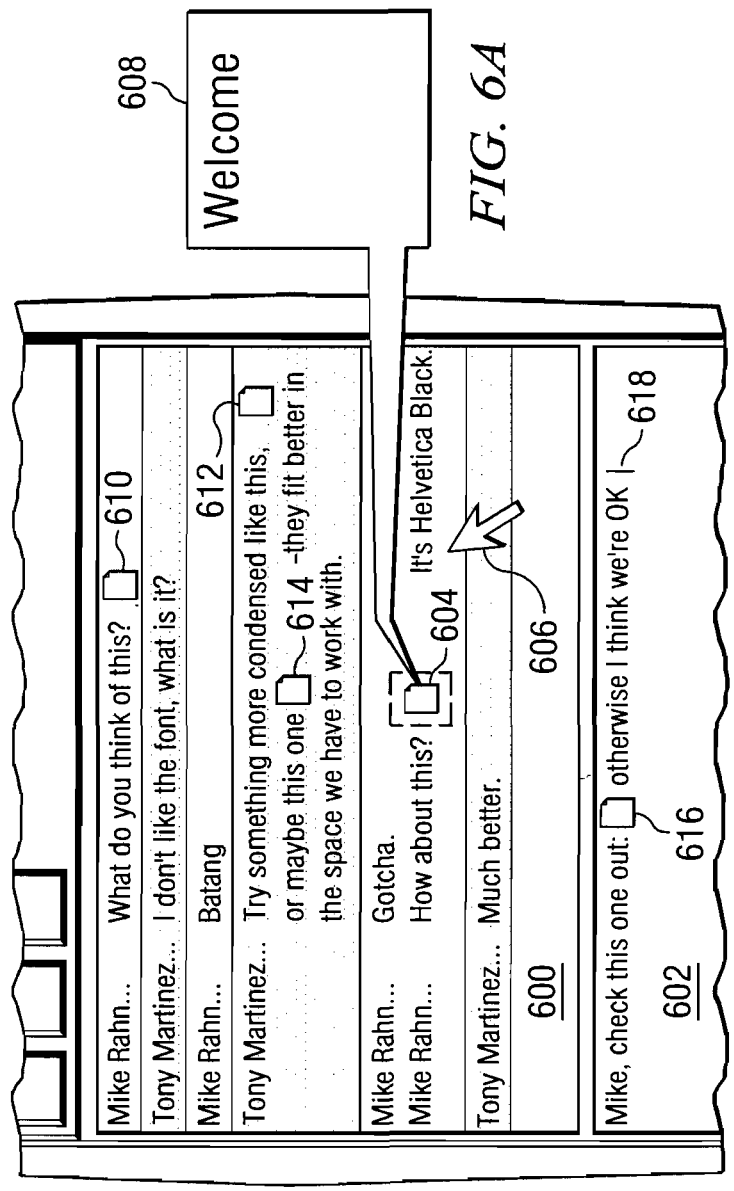

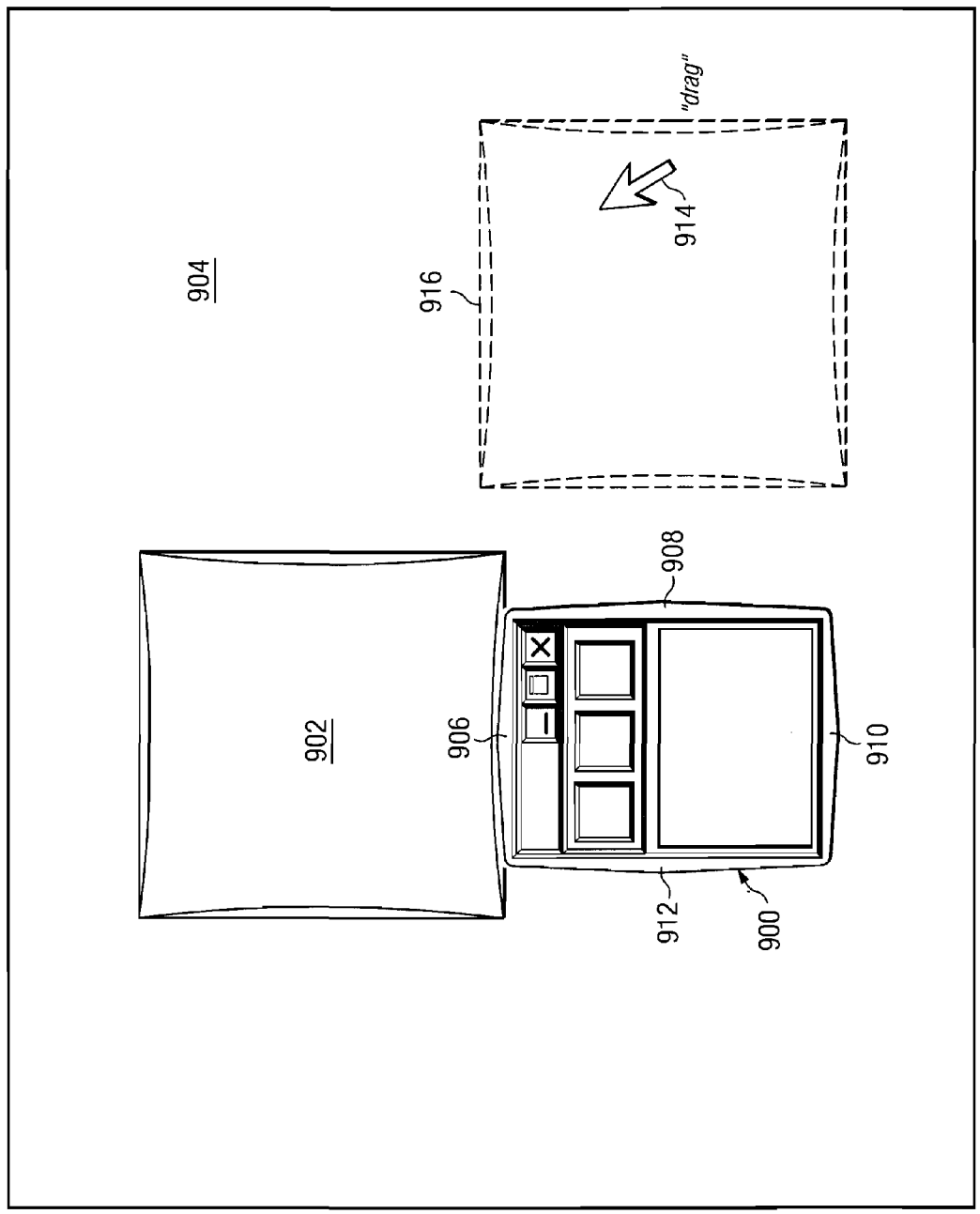

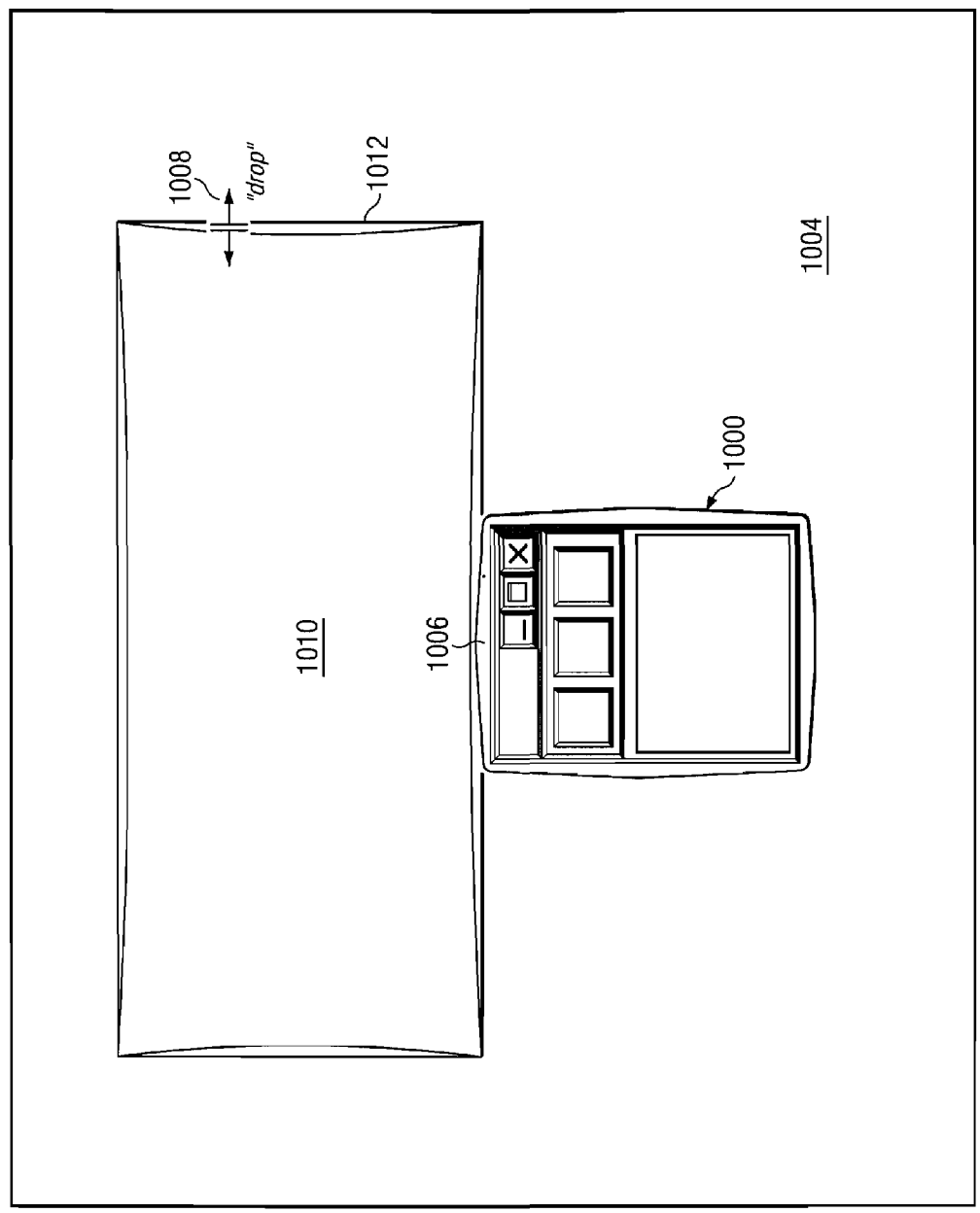

VIEWPOINT COLLABORATION

This application is a continuation of application Ser. No. 10/660,073, filed Sep. 11, 2003 now U.S. Pat. No. 7,269,794, status allowed.

BACKGROUND OF THE INVENTION

1. Technical Field

The present invention relates generally to an improved data processing system and in particular, to a method and apparatus for managing data transfers. Still more particularly, the present invention provides a method, apparatus, and computer instructions for managing the exchange of data in an instant message system.

2. Description of Related Art

Instant messaging is an online chat medium, allowing users to communicate with each other and collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate a text conversation with colleagues or customers when a desired contact becomes available. Millions of users communicate using instant messaging systems every day. With instant messaging becoming an important part of a both personal and business communications, functionality and usability enhancements are important to the continued success of this type of communication tool.

Other instant messaging type tools include collaboration applications, which allow for real time collaboration. Microsoft Net meeting, available from Microsoft, provide a discussion or chat function with a built-in sharing of external applications or whiteboards. These types of messaging programs are useful, but also include various problems. For example, image sharing is typically formed at an application window or desktop level. Alternatively, a cut and paste function may send images to a shared whiteboard. Application level sharing may be problematic because a mixture of private and public content may be present.

For example, a spreadsheet may contain shareable information, such as names of employees and their expertise as well as non-shareable information, such as payroll information. Restricting images that are transferred may be performed through a shared whiteboard through a copy and paste function. Through this copy and paste function, information that is shareable may be selected and pasted to the shared whiteboard. This feature, however, often is awkward and adds extra manual steps because many applications to not allow selective screen copying. As a result, the user may be required to employ an external screen capture program.

Further, in some cases, the shared image is too large or complex to be shared on a whiteboard or through an application. In this case, a user is required to resort to pointing and highlighting portions of the image to focus the discussion. Such a requirement adds extra manual steps. Text or recorded audio may be logged by these tools. An additional problem is correlating the text or recorded audio discussion with the images. The onscreen interaction plays in real time and is not stored or logged with the discussion. Therefore, it is often difficult to correlate or recreate the focus of the discussion at a later time.

Therefore, it would be advantageous to have an improved method, apparatus, and computer instructions for providing collaboration in which text and images may be easily shared.

SUMMARY OF THE INVENTION

The present invention provides a method, apparatus, and computer instructions for managing messages. A viewport is displayed on a display in association with a chat window in which the viewport defines an area on the display. The image is defined as graphical data in the area defined by the viewport to form a selected image in response to a user input to select an image. A marker is placed in a text message in the chat window in which the marker is associated with the selected image.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A-6B are portions of a chat window in accordance with a preferred embodiment of the present invention;

FIGS. 9A-9C are diagrams illustrating positioning of a viewport with respect to a chat window in accordance with a preferred embodiment of the present invention;

FIGS. 10A-10C are diagrams illustrating resizing of a viewport in accordance with a preferred embodiment of the present invention;

DETAILED DESCRIPTION OF THE PREFERRED EMBODIMENT

Figure 1:
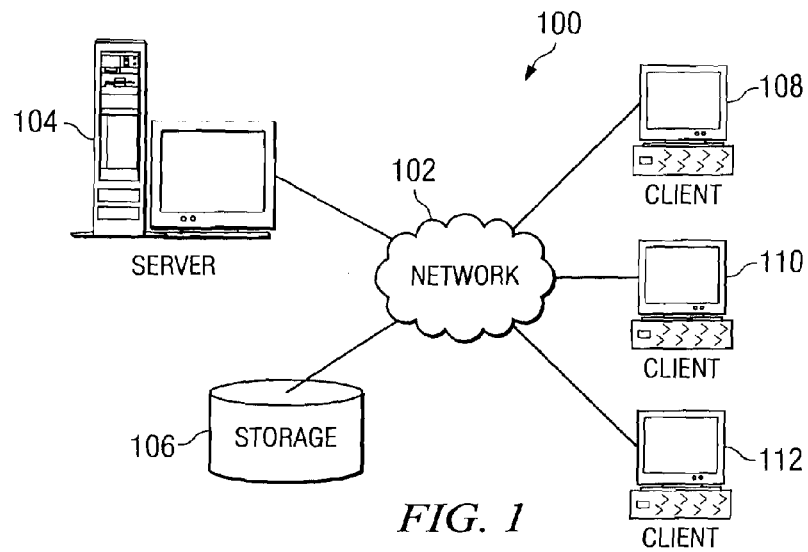
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
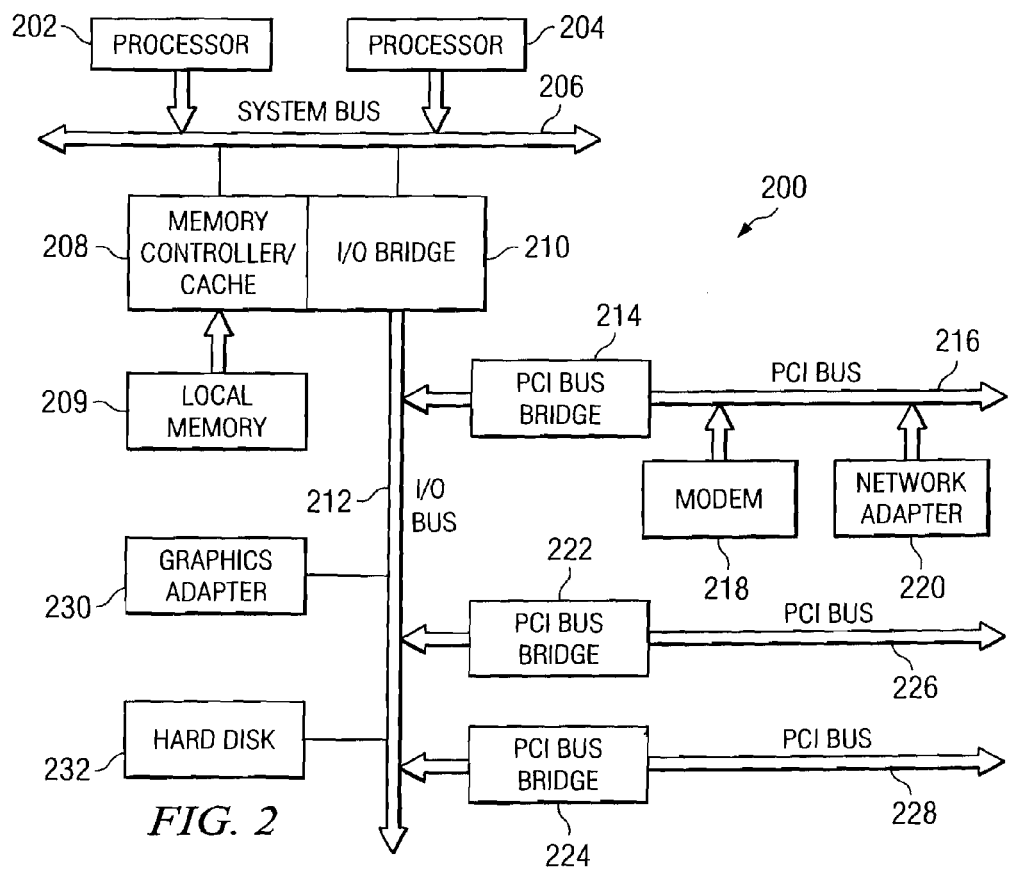
FIG. 2 is a block diagram of a data processing system that may be implemented as a server.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
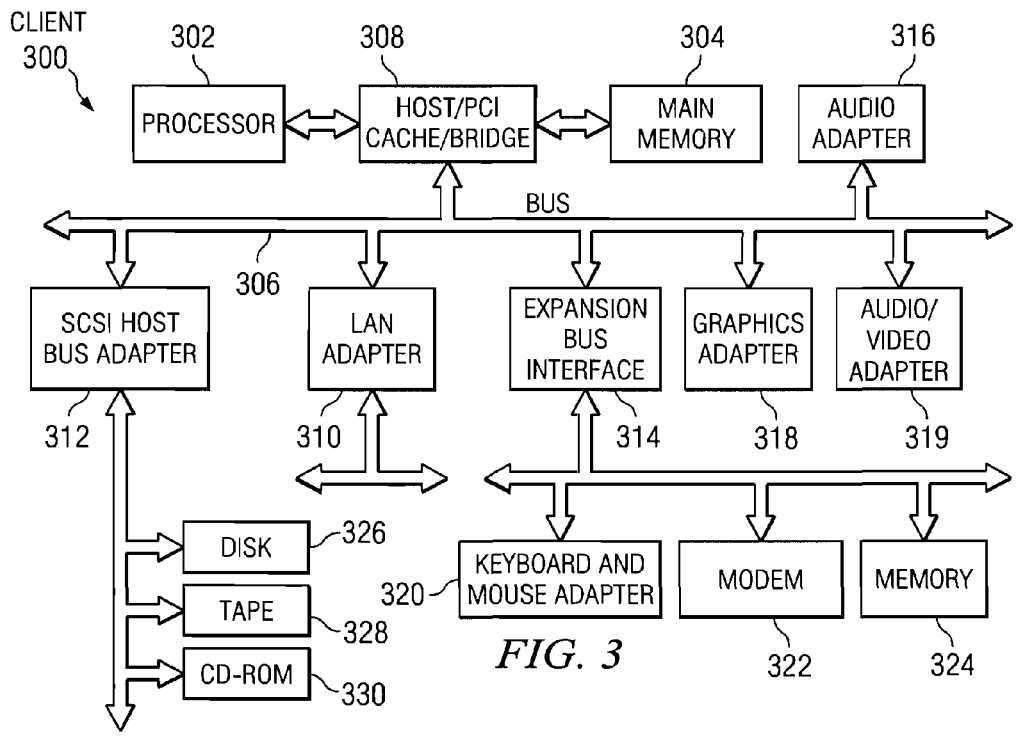
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for sharing images during a chat or collaboration session. The mechanism of the present invention addresses drawbacks currently present by combining real time discussion with shared images that are transmitted and logged in association with the discussion. In the depicted examples, an icon representing an image is displayed in line with the text. This icon is stored in association with the text when text or recorded audio is logged. Additional, the mechanism with the present invention provides a viewport to enable a sender to precisely control the sharing of images. This viewport allows for a fine granularity in sharing images. For example, a small fragment of objects on a desktop may be shared. A single control, an entire window, or an entire application may be shared through a viewport provided by the present invention. In these examples, a control may be, for example, a scroll box.

Figure 4:
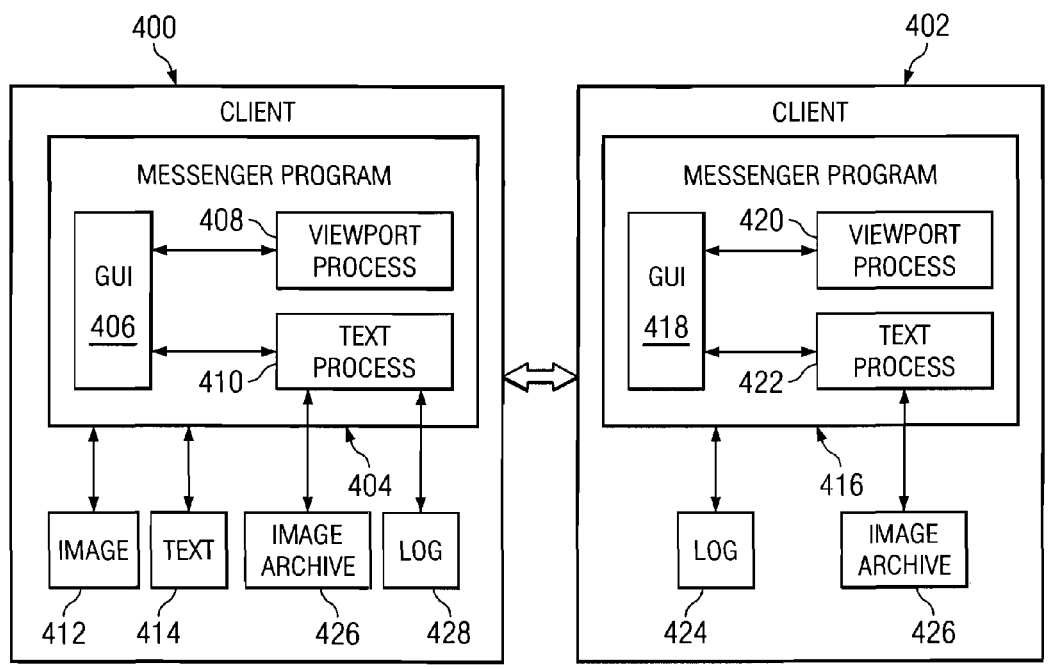
FIG. 4 is a block diagram illustrating components used in sharing images and text during a collaboration or chat session in accordance with a preferred embodiment of the present invention.

With reference now to FIG. 4, a block diagram illustrating components used in sharing images and text during a collaboration or chat session is depicted in accordance with a preferred embodiment of the present invention. In this example, a session is ongoing between client 400 and client 402.

Client 400 includes messaging program 404. Messaging program 404 provides graphical user interface 406, viewport process 408, and text process 410. GUI 406 provides the interface to allow a user to enter text, see text, select images, and see images during a session.

Viewport process 408 allows the user to precisely select images to be shared. For example, this process allows a user to share an image through an application, a window, or portions of a desktop through a viewport that may be manipulated by the user. Image 412 may take various forms, such as a portion of a desktop, a window in an application, or a control. Text process 410 allows a user to enter text, such as a text 414, through GUI 406 for transmission to another user.

In this example, a session is established with a user at client 402. This client includes messenger program 416, which contains GUI 418, viewport process 420, and text process 422. Text 414 and image 412 entered by a user through GUT 406 at client 400, may be transmitted to client 402. This information is processed by messenger program 416 to display text 414 and image 412 to the user through GUI 418. Further, this text may be stored in log 424 and images received may be stored in image archive 426. Client 400 also includes log 428 and image archive 430.

Text stored in log 424 includes markers or identifiers within the text to correlate images stored in the image archive. In these examples, a marker in the form of an icon is presented to the user in line with the text. This icon is located at the point at which a sender of an image has selected as being relevant to the ongoing discussion. In this manner, these icons allow for later viewing of images in context with the discussion stored in a log. Other types of markers may be used. For example, the markers may take the form of a thumbnail representing the captured image.

In these examples, messenger program 404 and messenger program 420 may be an instant messenger program or a real time collaboration tool. The mechanism of the present invention may be applied to any program or application, which allows for the sharing of text and images between different users on a real time basis. Further, the mechanism of the present invention also may be applied to a messaging system in which audio is exchanged rather than text. For example, users may have a voice discussion, rather than send text. In this type of messaging, a user may send an image to another user. In this case, a marker may be provided and the audio or voice file at the point in the conversation when the image is sent.

Figure 5:
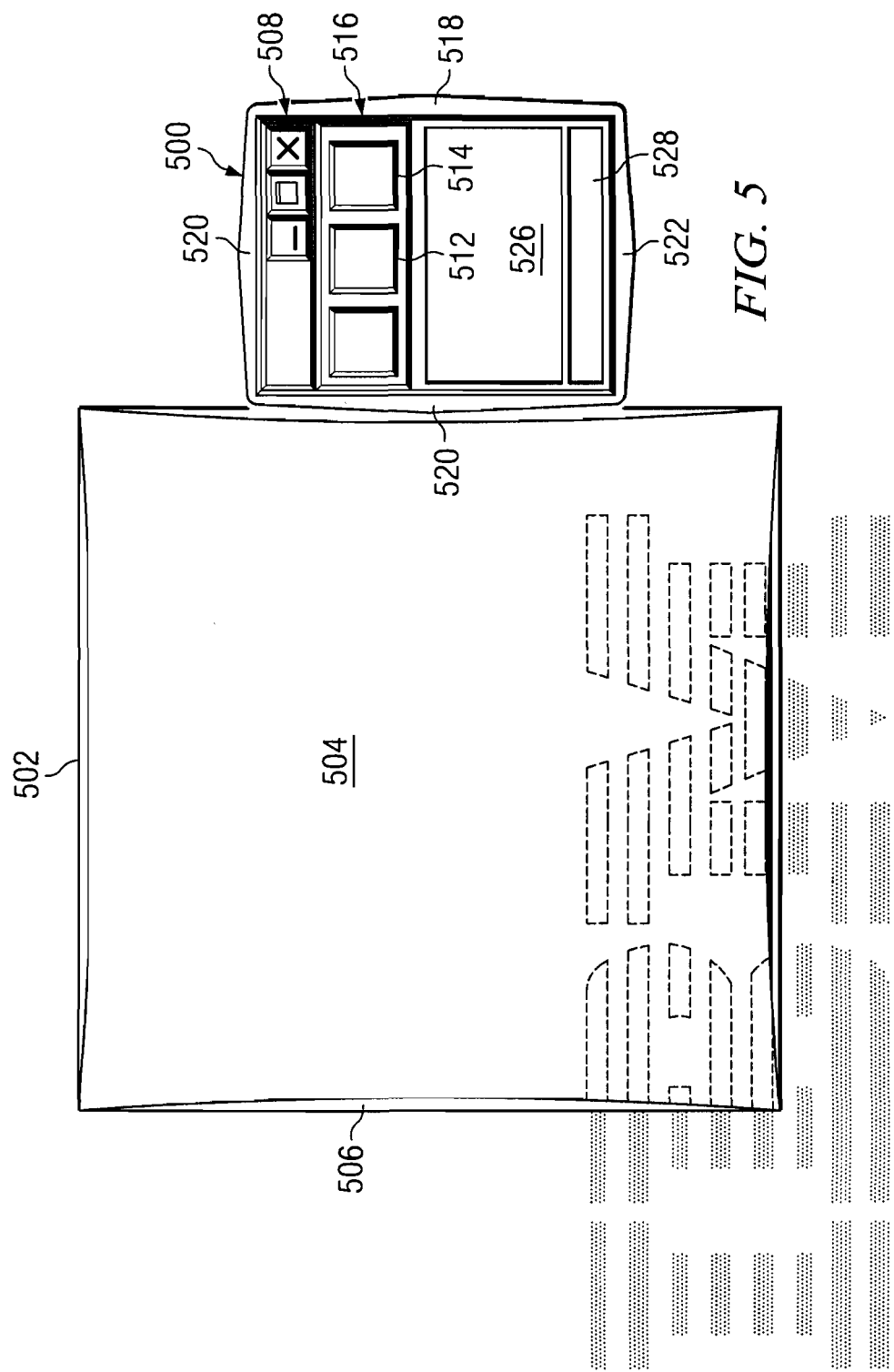
FIG. 5 is a diagram of a graphical user interface (GUI) for a messenger program in accordance with a preferred embodiment of the present invention.

Turning now to FIG. 5, a diagram of a graphical user interface (GUI) for a messenger program is depicted in accordance with a preferred embodiment of the present invention. In this example, chat window 500 is displayed with viewport 502. These two components make up a graphical user interface, such as GUI 406 for a messenger program, such as messenger program 404 in FIG. 4.

As illustrated, viewport 502 is attached to chat window 500. Viewport 502 is sizeable and moveable. The size and position of the viewport 502 may be adjusted to cover a visual area on a display or screen that is to be transmitted. Further, a "snap" feature may be employed to allowed viewport 502 to snap directly to an application, a window, or a control, such a scroll box in a window. When a message is being typed and a "capture" command is used, the image is placed in line with the message using a marker, such as an icon.

On the receiver side, as the message is received, the image may be automatically displayed in a callout window. Since these images are in line with text, it is possible to view past images in the context with their textual descriptions. Further, this mechanism also allows for saving of the transcript in a log, such as log 424 in FIG. 4 with images in an image archive, such as image archive 426 in which the images are in the correct context with the discussion. The images are associated with markers in the log.

With reference still to FIG. 5, viewport 502 includes translucent viewport panel 504. Glass channel 506 connects viewport panel 504 to chat window 500. In this example, glass channel 506 provides a visual effect in the depicted example. Viewport 502 contains viewport panel 504 and glass channel 506. Viewport 502 may be resized by moving a pointer to any corner or edge and selecting the corner edge and dragging that corner or edge as needed.

Chat window 500 includes title bar 508, control button 510, control button 512, control button 514, size border 516, slide rail 518, slide rail 520, chat history window 526, and composition window 528. Title bar 508 may be used in this example to move chat window 500 and viewport 502 through a "drag" and "drop" operation.

Control buttons 510, 512, and 514 may be employed to perform various functions. These functions include, for example, capturing an image encompassed by viewport 502, transmitting the captured image, and attaching the captured image to the current text point in a transcript.

Size border 516 may be used to resize chat window 500. A slide rail is a component of chat window 500 where viewport 502 may be attached. Slide rail 518, slide rail 520 and slide rail 522 are unoccupied in these examples. Slide rail 520 is occupied in this example by viewport 502. In these examples, selecting an unoccupied slide rail brings viewport 502 to the selected slide rail.

Text sent and received by a user are displayed in chat history window 526. Further, markers for images also are displayed in this window. Chat composition window 528 allows the user to enter text to be sent to another user.

Figure 6B:
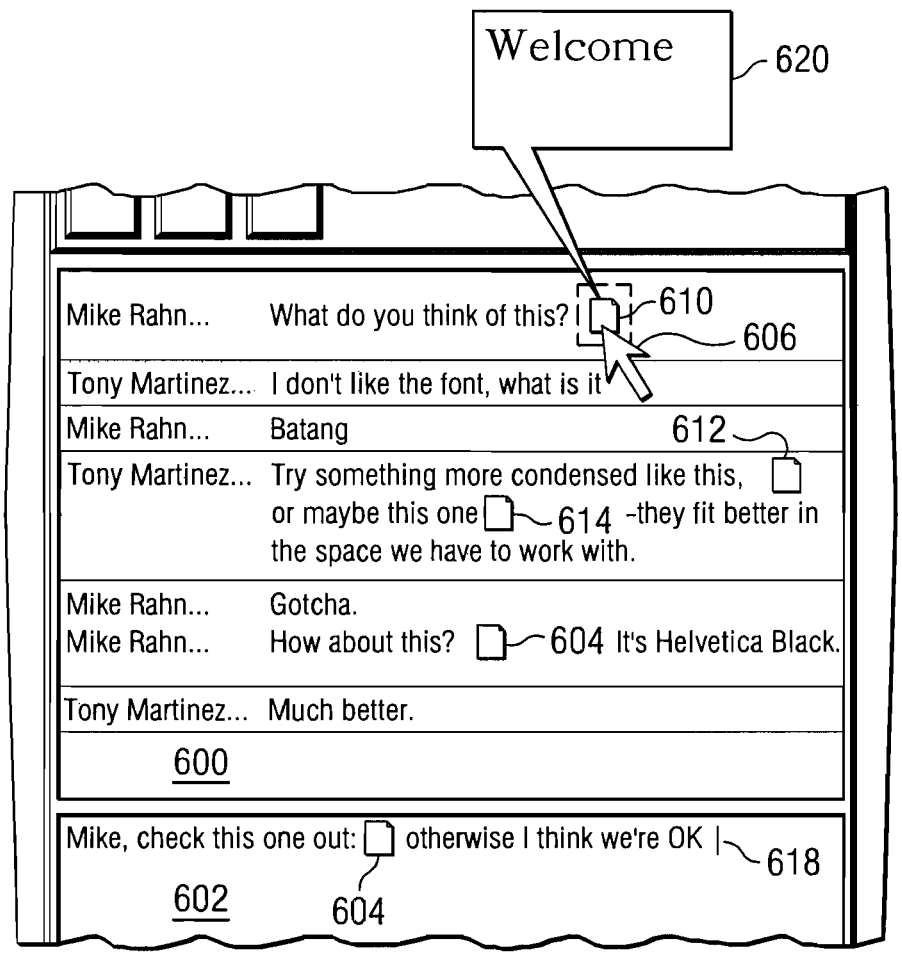

With reference now to FIGS. 6A-6B, portions of a chat window are depicted in accordance with a preferred embodiment of the present invention. In FIG. 6A, chat history window 600 and chat composition window 602 are part of a chat window, such as chat window 500 in FIG. 5.

In this example, the sender of text images is Mike Rahn while the recipient is Tony Martinez. The discussion relates to fonts. Marker 604 is an icon illustrating the last image sent by Mike Rahn. As illustrated, pointer 606 has been moved over marker 604 resulting in callout window 608 being displayed. Callout window 608 displays the image associated with marker 604. In this example, callout window 618 displays an image of the word "welcome" in one font. Other messages in chat history window 600 also are associated with images, as illustrated by markers 610, 612, and 614. Chat composition window 602 contains marker 616, which has been placed within message 618. This message has not yet been sent. Movement of pointer 606 over marker 616 will result in the image associated with that marker being displayed.

In FIG. 6B, pointer 606 is moved over marker 610 resulting in callout window 620 being displayed. An image of the word "welcome" is displayed in callout window 620 in a different font. If the text and images illustrated in FIGS. 6A and 63 are logged, either of the users may later go back and view the discussion and see the relevant images at the appropriate points in the discussion.

Figure 7A:
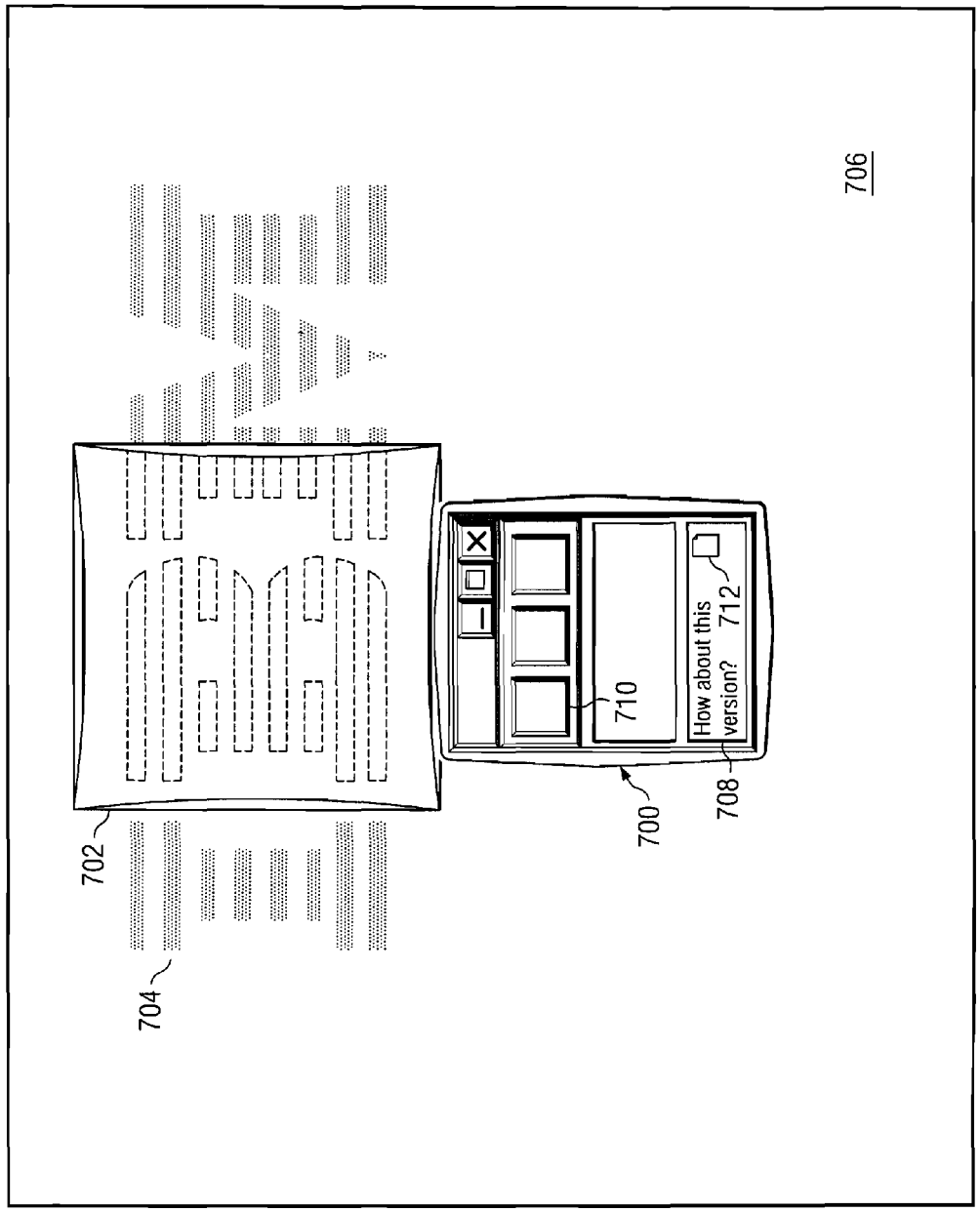
FIGS. 7A-7B are diagrams illustrating the selection and transmission of an image in accordance with a preferred embodiment of the present invention.
Figure 7B:
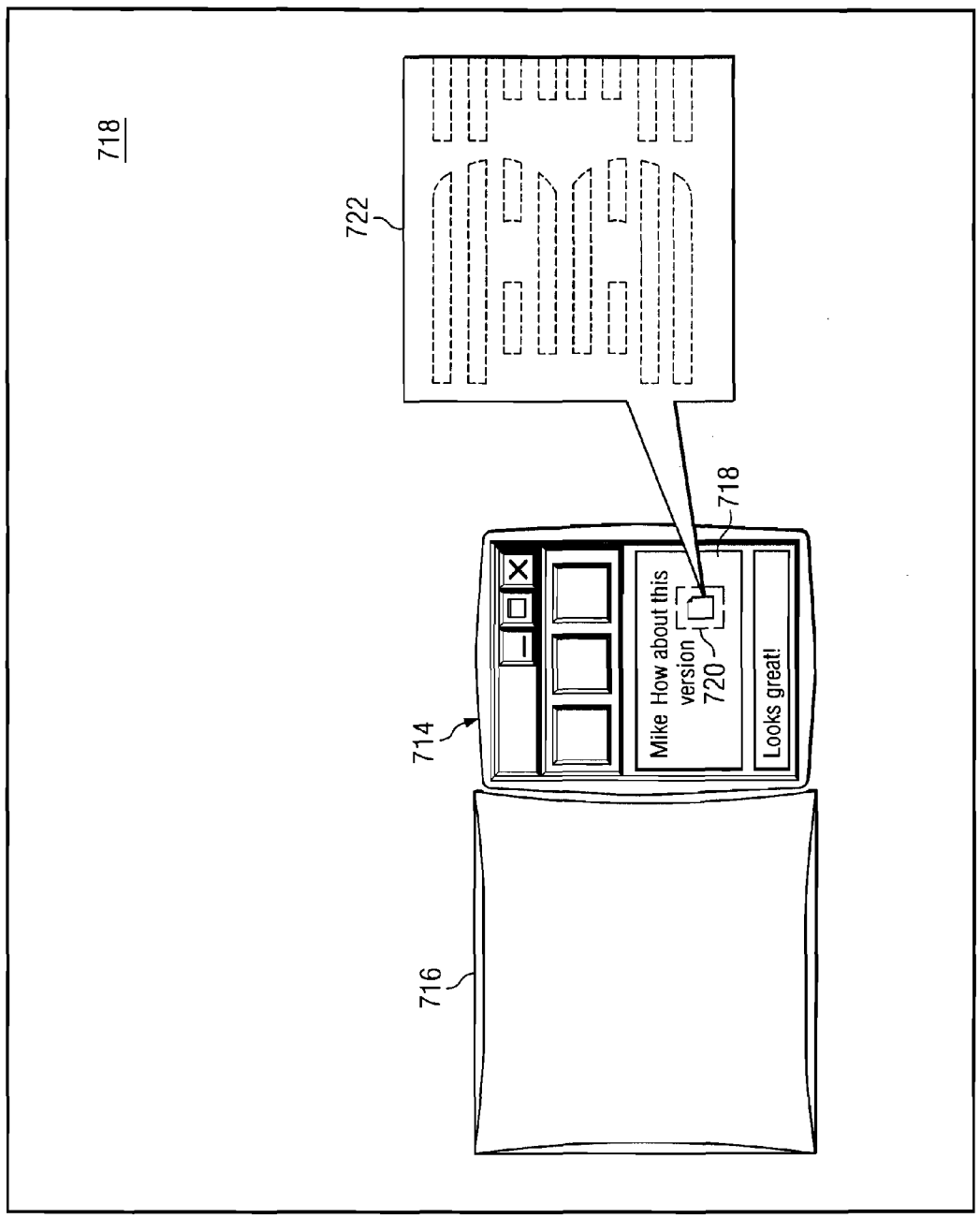

Turning next to FIGS. 7A-7B, diagrams illustrating the selection and transmission of an image is depicted in accordance with a preferred embodiment of the present invention. In this example, chat window 700 and viewport 702 are positioned over a portion of graphical image 704 within display 706. In this example, a sender creates a message in chat composition window 708 by selecting a control, such as control button 710. The portion of graphical image 704 encompassed or covered by viewport 702 is captured through a selection of button 710. When the capture occurs, marker 712 is inserted into the message being created in chat composition window 708.

In FIG. 7B, chat window 714 and viewport 716 are displayed within display 718. Display 706 is located in a client, such as client 400 in FIG. 4. Display 718 is located in a client, such as client 402 in FIG. 4. The message generated using chat window 700 is received by chat window 714. Upon receipt of the message, the message is displayed in chat history window 718. As can be seen, marker 720 identifies that an image is associated with the message. Further, callout window 722 is displayed containing the portion of the graphic that was defined or covered by viewport 702 in FIG. 7A.

Figure 8A:
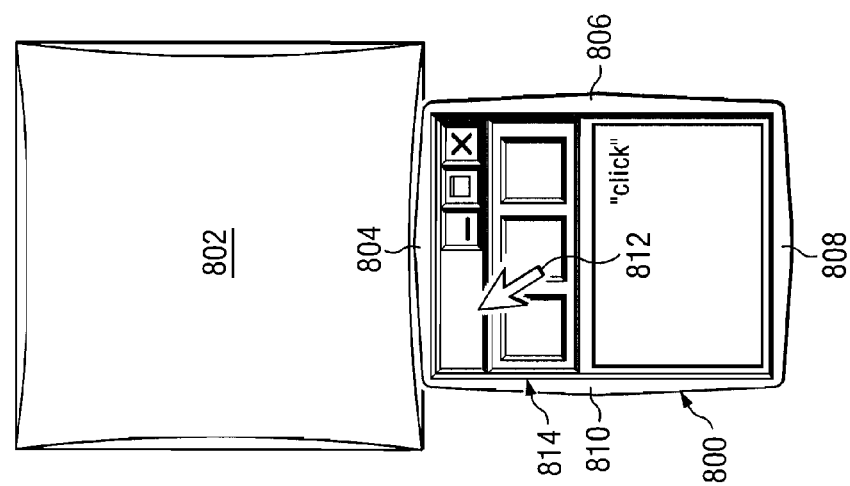
FIGS. 8A-8C are diagrams illustrating movement of a viewport in accordance to a preferred embodiment of the present invention.
Figure 8B:
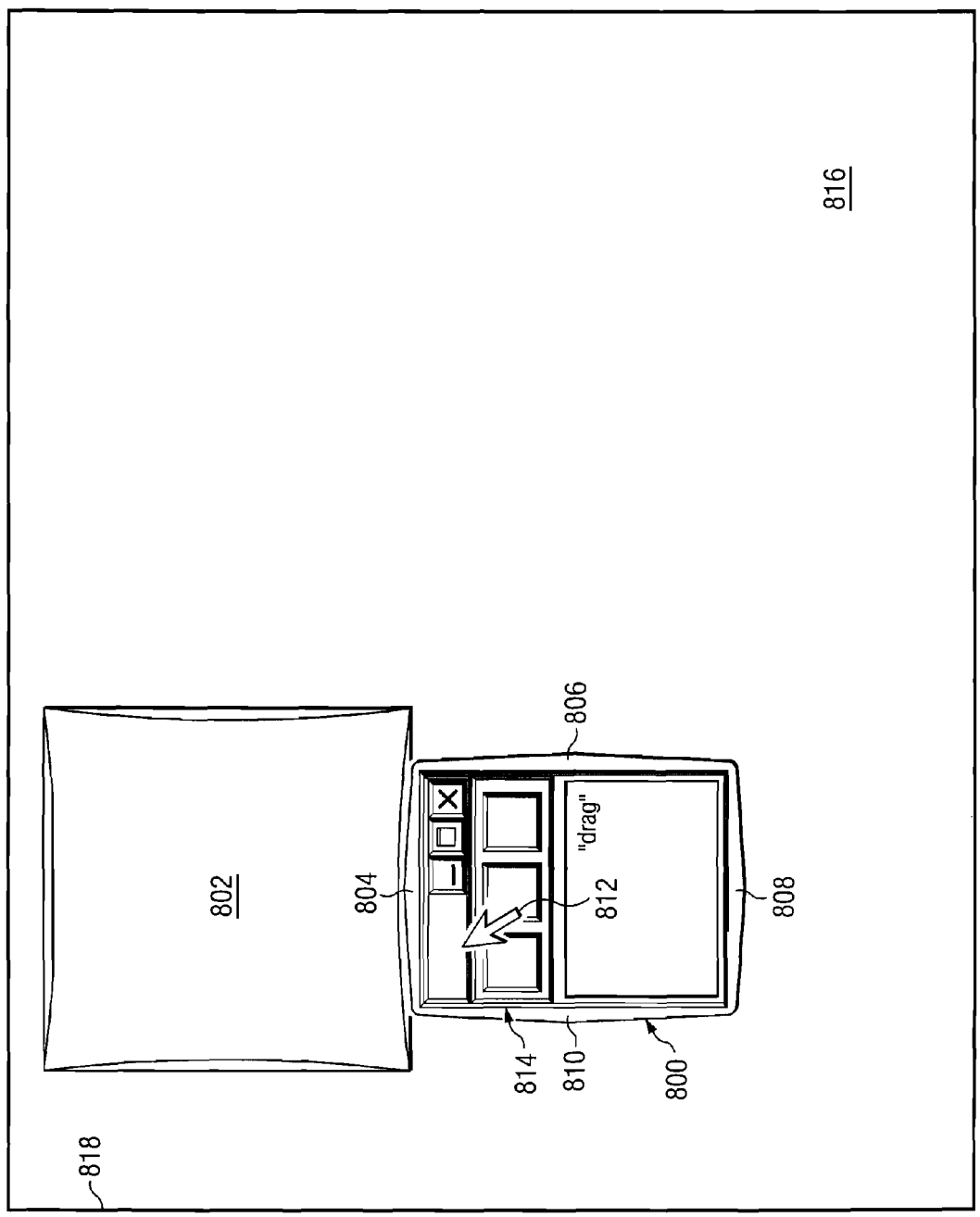
Figure 8C:
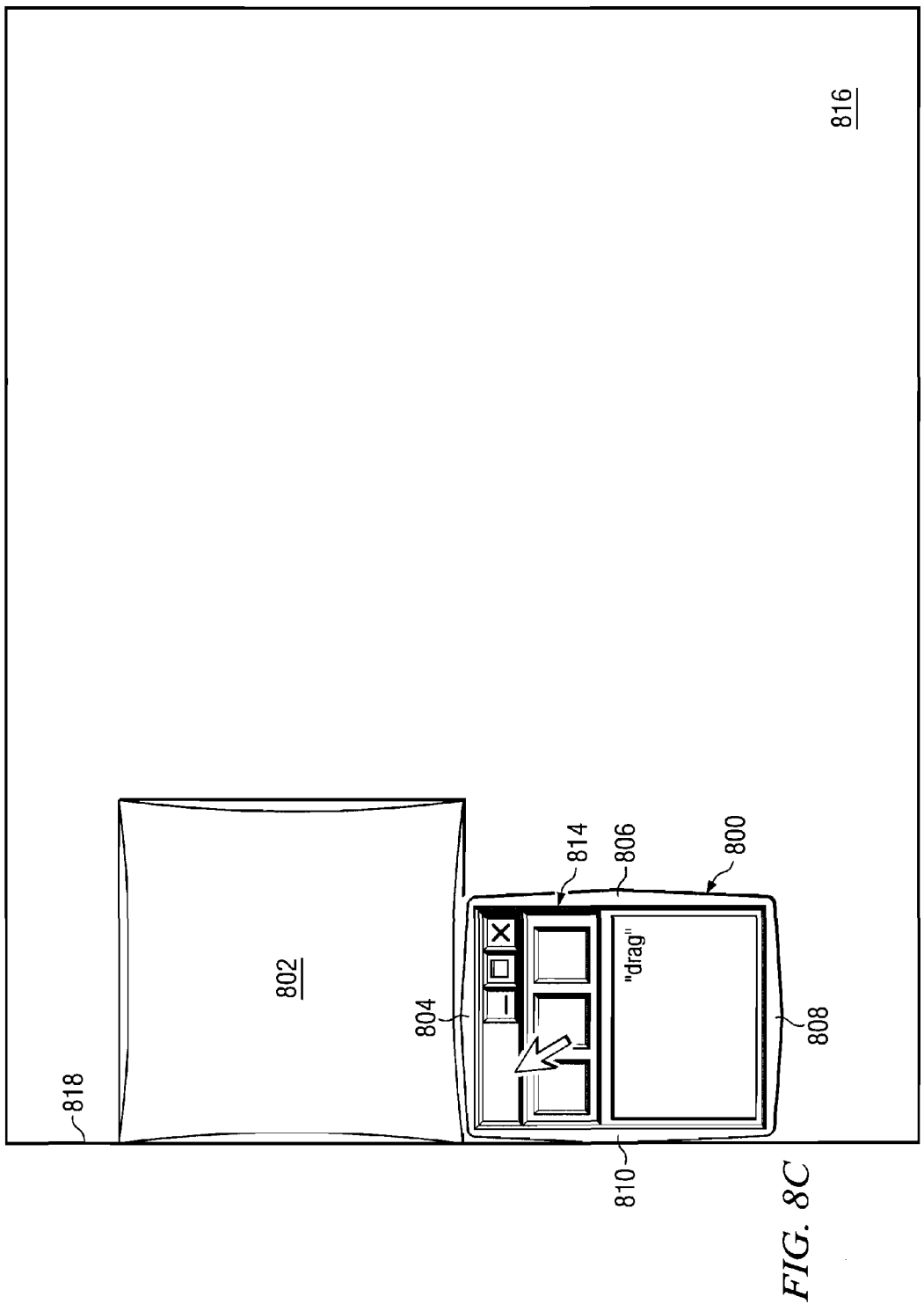

Turning now to FIGS. 8A-8C, diagrams illustrating movement of a viewport are depicted in accordance to a preferred embodiment of the present invention. In this example, chat window 800 and viewport 802 are shown to illustrate the movement of these components.

Viewport 802 is attached to slide rail 804. Slide rails 806, 808, and 810 are unoccupied. Pointer 812 has been positioned over title bar 814 to drag the assembly of chat window 800 and viewport 802 across display 816. In FIG. 8C, the assembly of chat window 800 and viewport 802 has been dragged such that slide rail 810 contacts the edge of display 816. As can be seen, viewport 802 remains attached to slide rail 804. In these examples, viewport 802 does not move off display 816. Instead, viewport 802 slides or adjusts to remain on display 816, rather than moving off screen. In this manner, it is always clear what objects or images are covered by viewport 802.

Figure 9A:
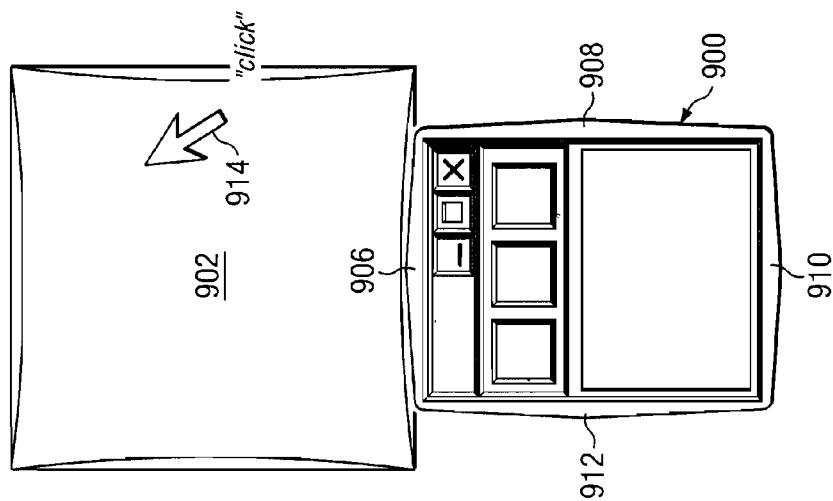
Figure 9C:
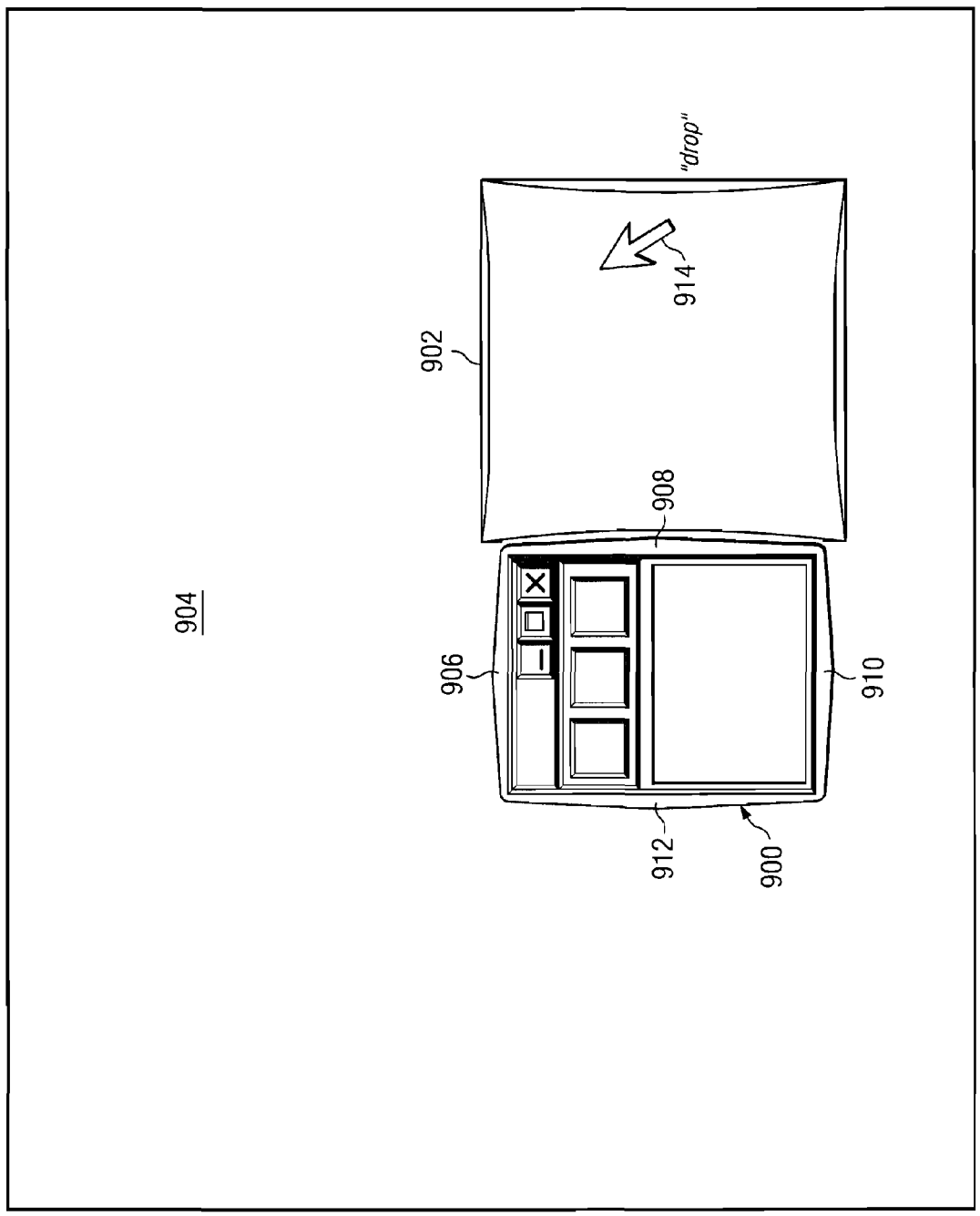

With reference now to FIGS. 9A-9C, diagrams illustrating positioning of a viewport with respect to a chat window is depicted in accordance with a preferred embodiment of the present invention. In FIG. 9A, chat window 900 and viewport 902 are displayed on display 904. In this example, slide rail 906 is occupied by viewport 902. Slide rails 908, 910, and 912 are unoccupied. Pointer 914 is used to select viewport 902. In FIG. 9B, viewport 902 has been dragged by pointer 914, as illustrated by phantom viewport 916. Phantom viewport 916 is positioned near slide rail 908. In FIG. 9C, viewport 902 has been dropped and is now positioned along slide rail 908 with slide rail 906 becoming unoccupied.

Figure 10A:
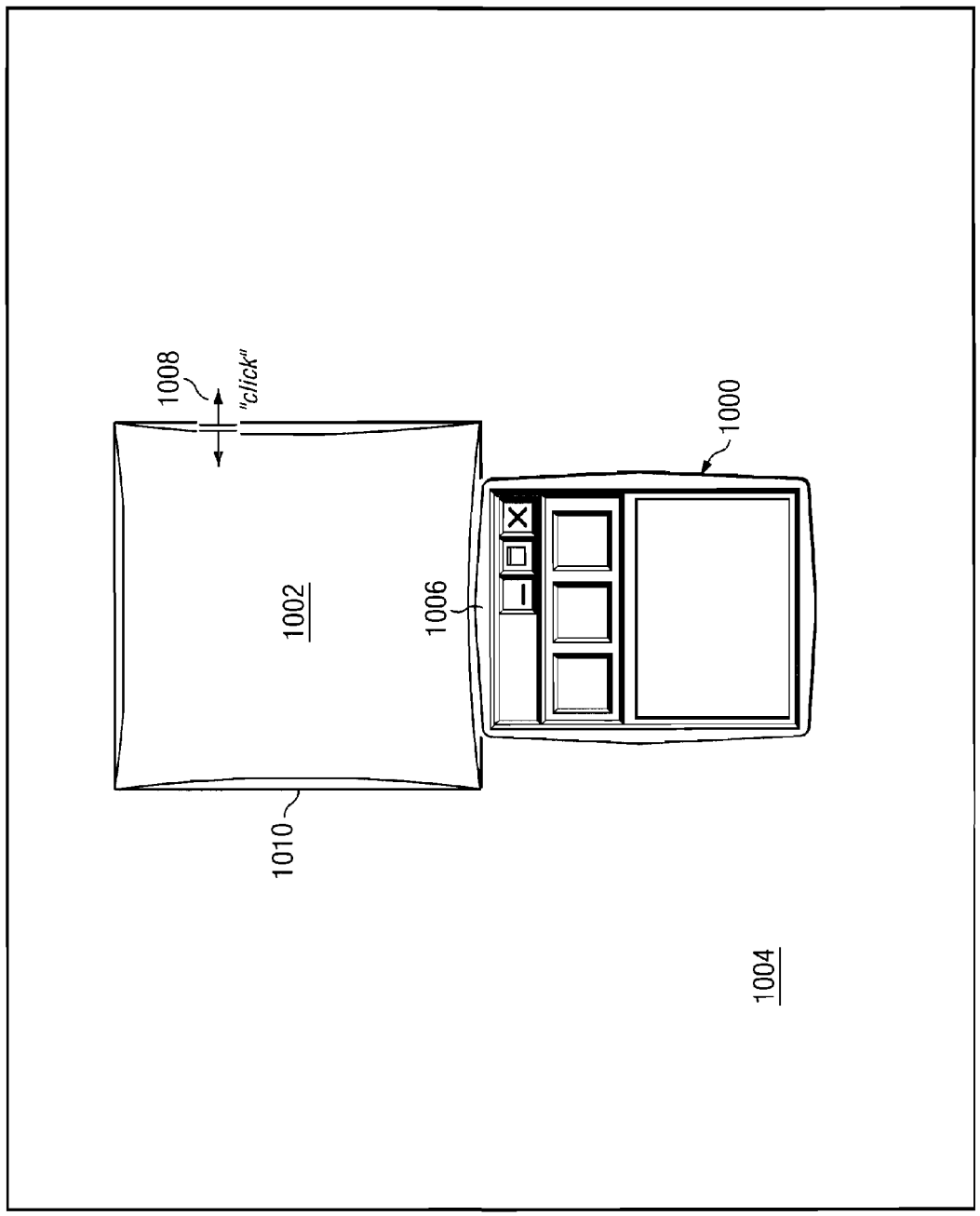
Figure 10B:
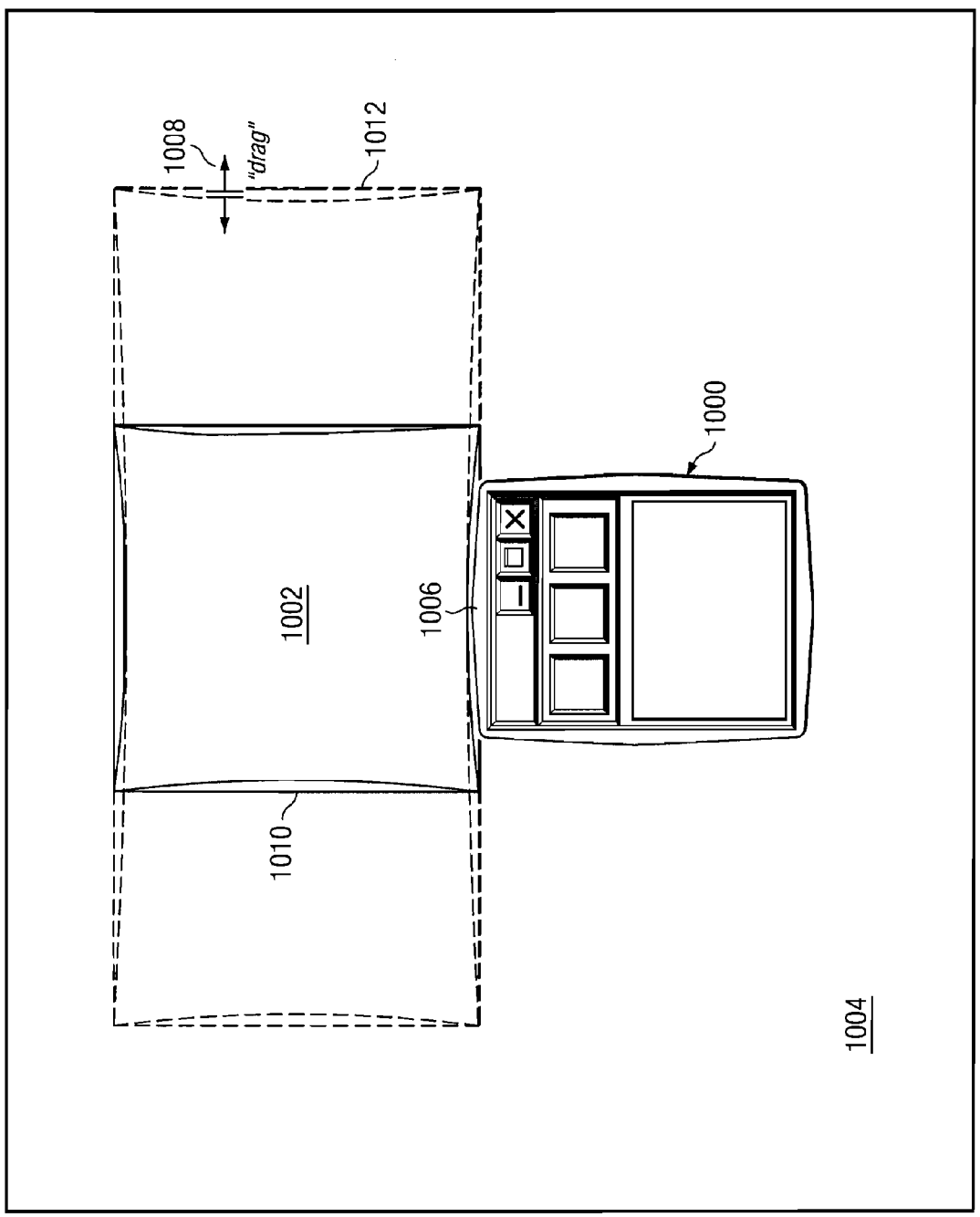

With reference to FIGS. 10A-10C, diagrams illustrating resizing of a viewport are depicted in accordance with a preferred embodiment of the present invention. In FIG. 10A, chat window 1000 and viewport 1002 are displayed on display 1004. In this example, slide rail 1006 is occupied by viewport 1002. Pointer 1008 has not been positioned on slide 1010 to allow resizing of viewport 1002. In FIG. 10B, pointer 1008 drags slide 1010 to resize viewport 1002 to the dimensions illustrated by phantom viewport 1012, in FIG. 10C, viewport 1002 has been dropped and is now resized within display 1004.

Figure 11A:
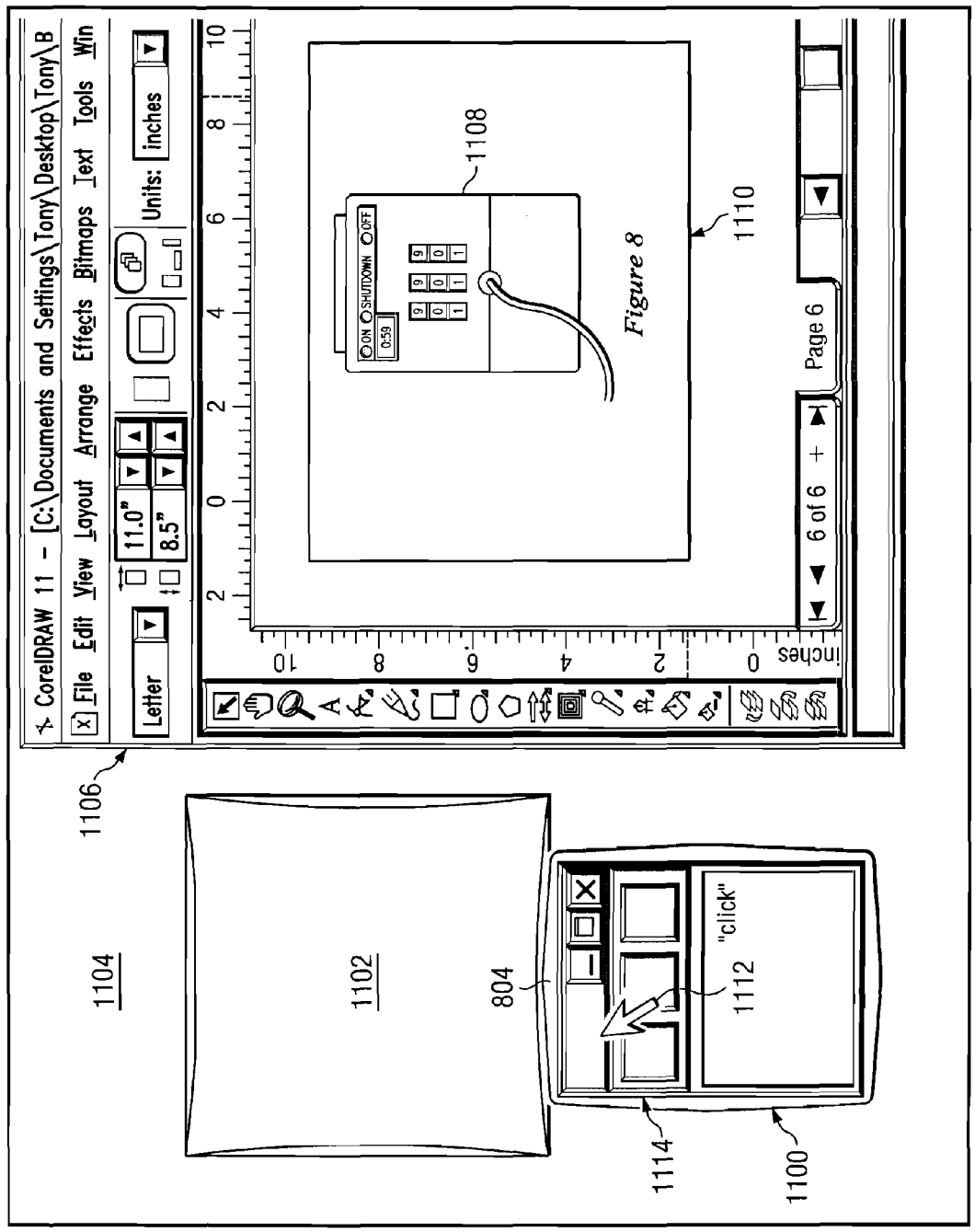
FIGS. 11A-11B are diagrams illustrating movement of a viewport around a desktop to select an image in accordance with a preferred embodiment of the present invention.
Figure 11B:
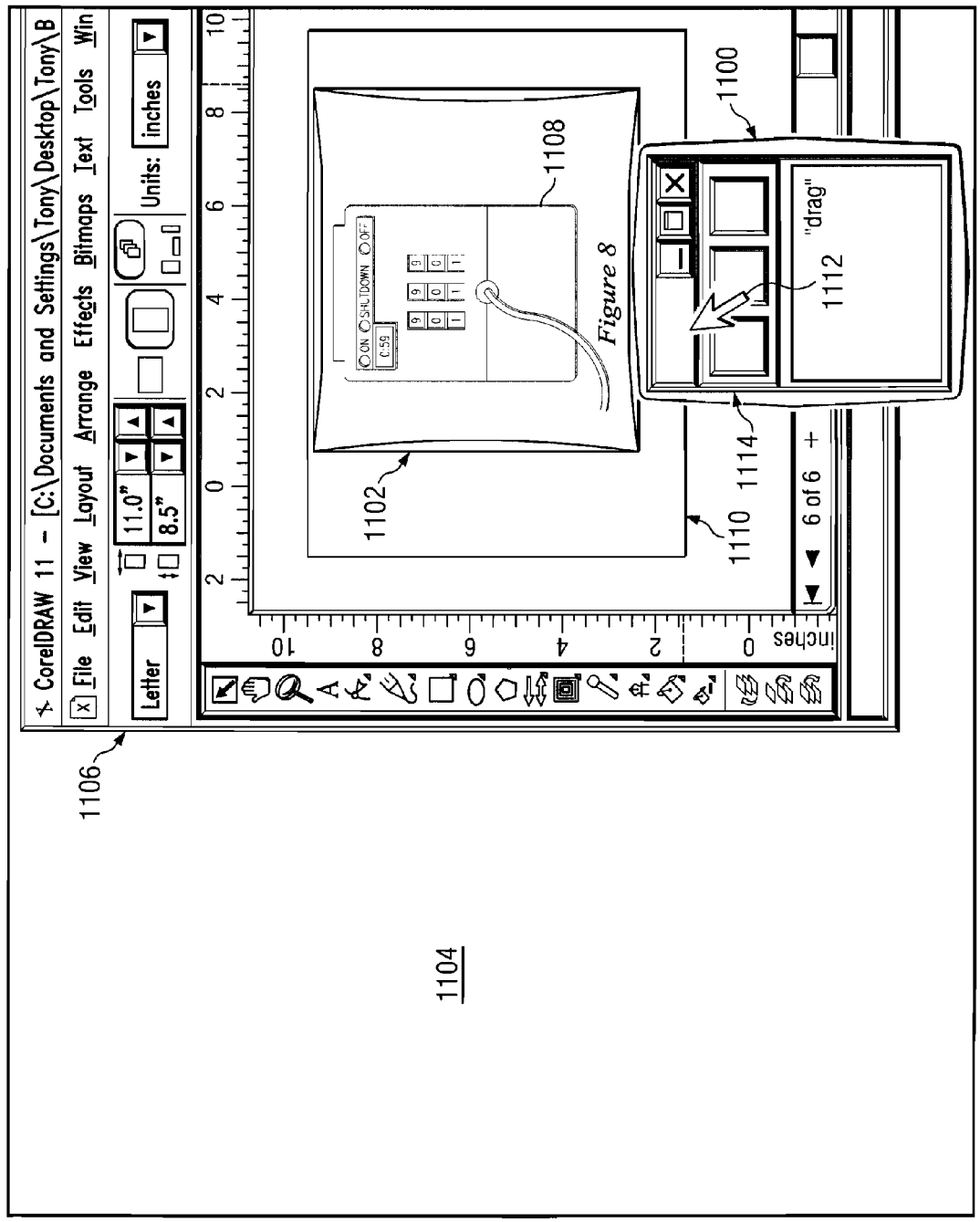

Turning next to FIGS. 11A-11B, diagrams illustrating movement of a viewport around a desktop to select an image is depicted in accordance with a preferred embodiment of the present invention. In this example, chat window 1100 and viewport 1102 are located in display in 1104. Also located in display 1104 is window 1106 which contains a graphical image 1108 displayed on page 1110.

Pointer 1112 has been placed over title bar 1114, and title bar 1114 has been selected to drag chat window 1100 and viewport 1102 over graphical image 1108 as illustrated in FIG. 11B. As can be seen, viewport 1112 is placed over graphical image 1108. The portions of page 1110 encompassed by viewport 1102 can be captured and sent to another user. In this manner, only the portion of page 1110 encompassed by viewport 1102 is sent. Other portions within page 1110 and window 1106 are not captured or sent in this example.

Figure 12A:
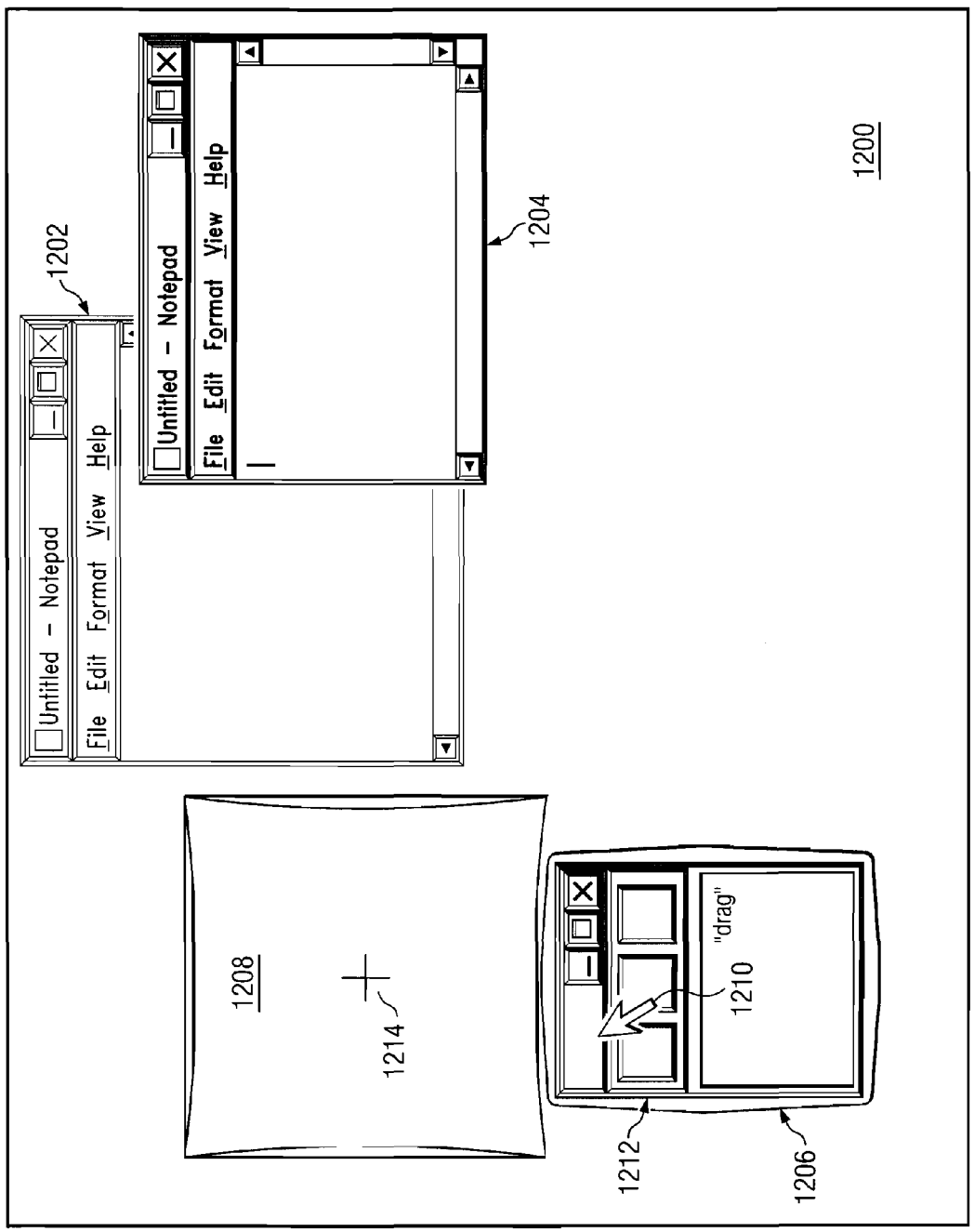
FIGS. 12A-12E are diagrams illustrating movement and resizing of a viewport using a snap feature in accordance with a preferred embodiment of the present invention.

Turning next to FIGS. 12A-12E, diagrams illustrating movement and resizing of a viewport using a snap feature are depicted in accordance with a preferred embodiment of the present invention. In FIG. 12A, display 1200 contains windows 1202 and 1204. Chat window 1206 and viewport 1208 also are present in display 1200. In this example, a snap or "snap-to" feature is illustrated in which a viewport, such as viewport 1208, may resize itself to the dimensions of a selected application window.

When the snap feature is enabled and pointer 1210 has selected title bar 1212 and drag operation occurs with chat window 1206 and viewport 1208, cross hair 1214 appears. This cross hair provides a hot spot indicating objects subject to the snap feature.

Figure 12B:
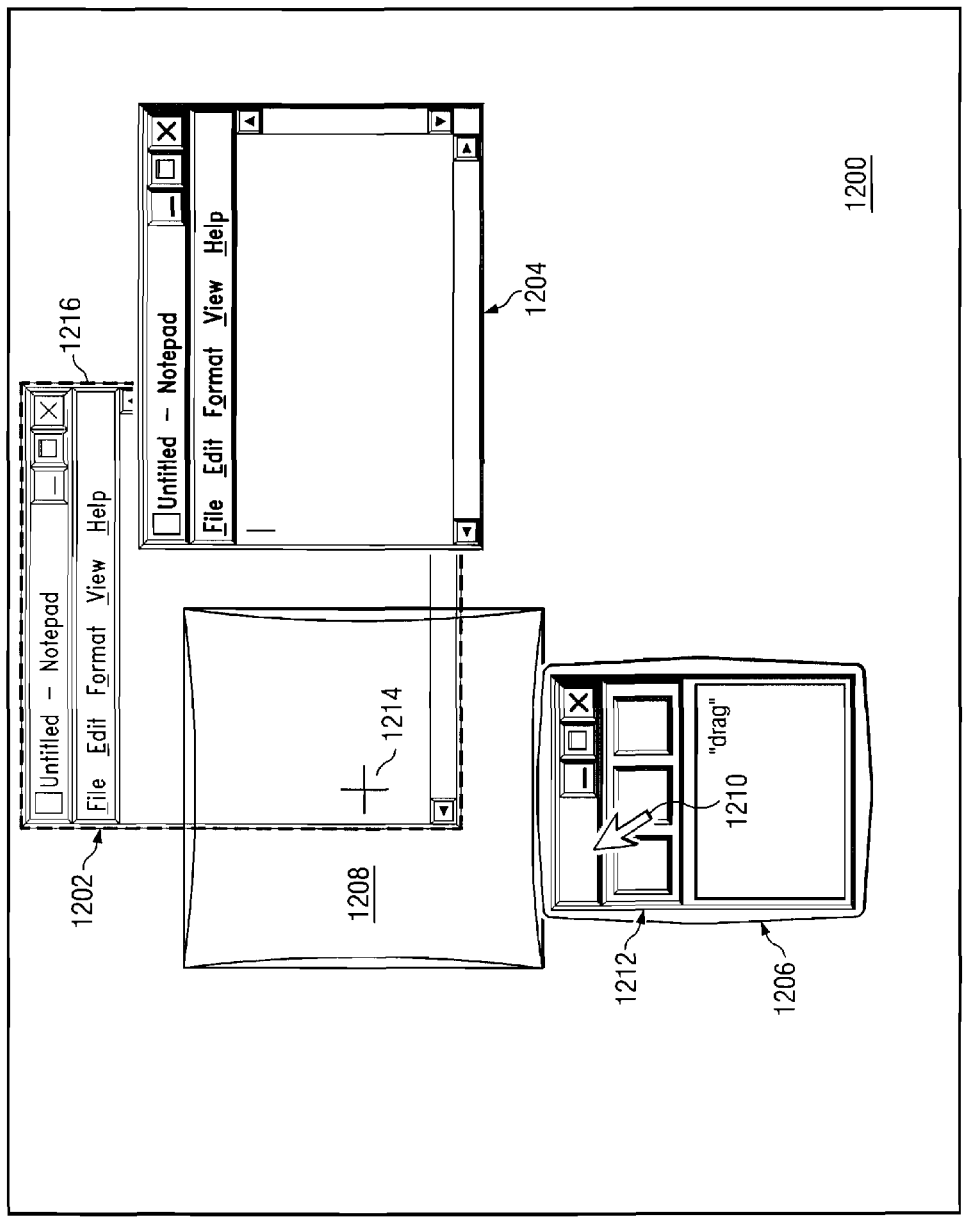

In FIG. 12B, chat window 1206 and viewport 1208 are dragged such that cross hair 1214 is over window 1202. With cross hair 1214 moving within the boundary of window 1202, dashed outline 1216 appears around window 1202. Of course any other type of indicator, such as causing window 1202 to flash or changing the color of the window may be used to indicate that cross hair 1214 is over window 1202.

Figure 12C:
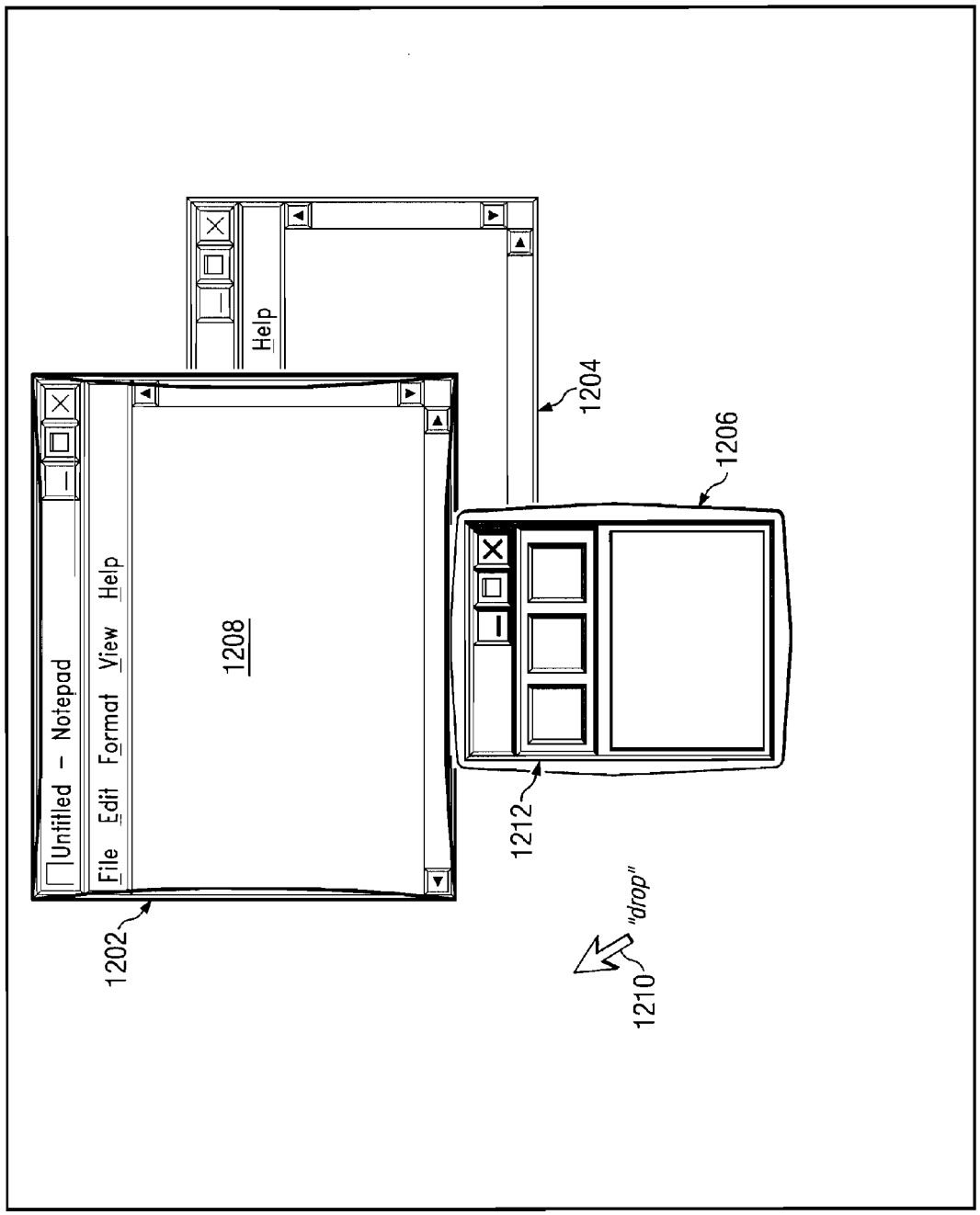

Dashed outline 1216 indicates that viewport 1214 will snap to window 1202 when viewport 1208 is dropped as illustrated in FIG. 12C. As can be seen, viewport 1208 has resized itself to encompass window 1202.

Next, in FIG. 12D, pointer 1210 has again been moved to select title bar 1212 and drag chat window 1206 and viewport 1208 over window 1204. In FIG. 12C, cross hair 1214 is no longer displayed since chat window 1206 and viewport 1208 have been dropped.

Figure 12D:
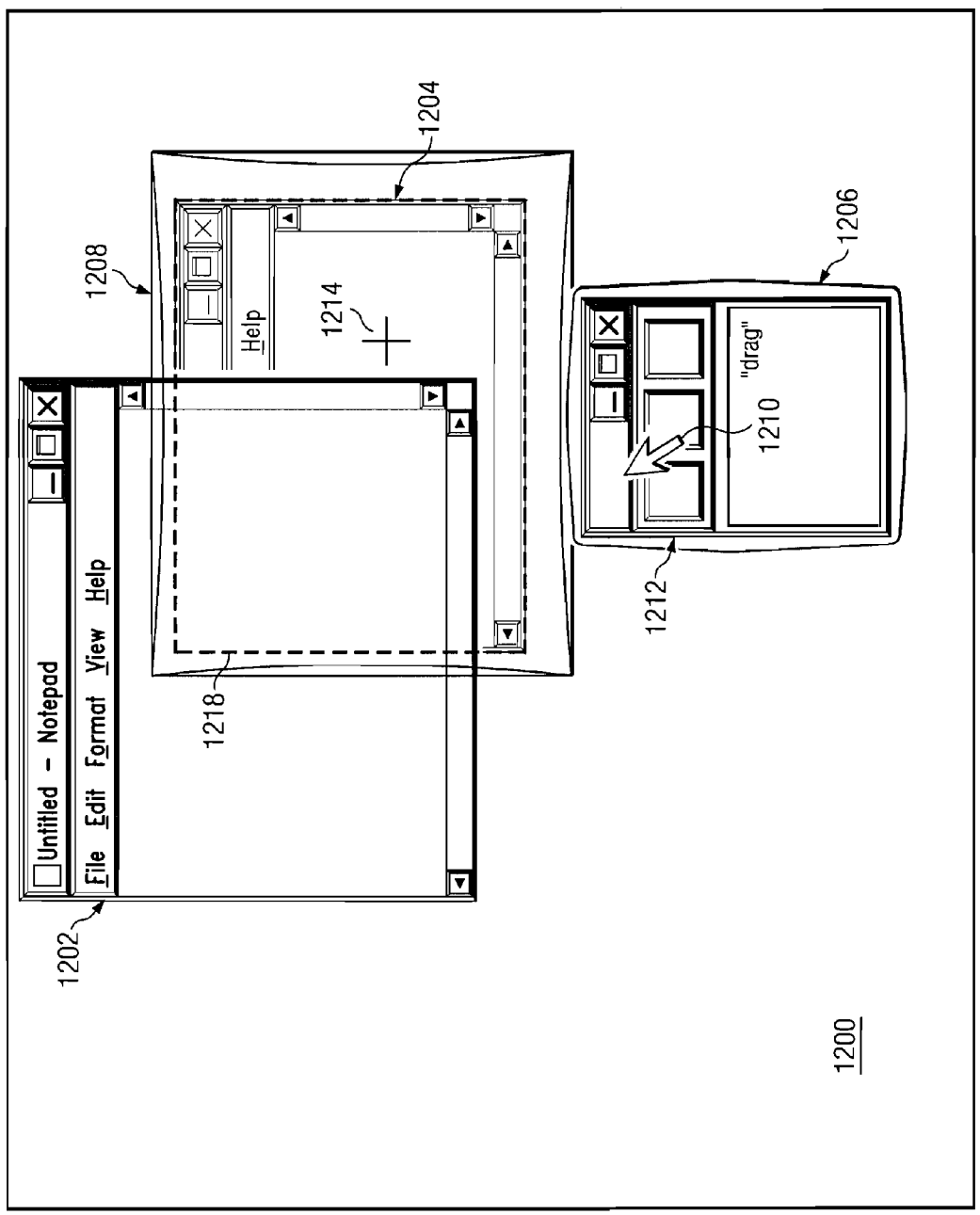
Figure 12E:
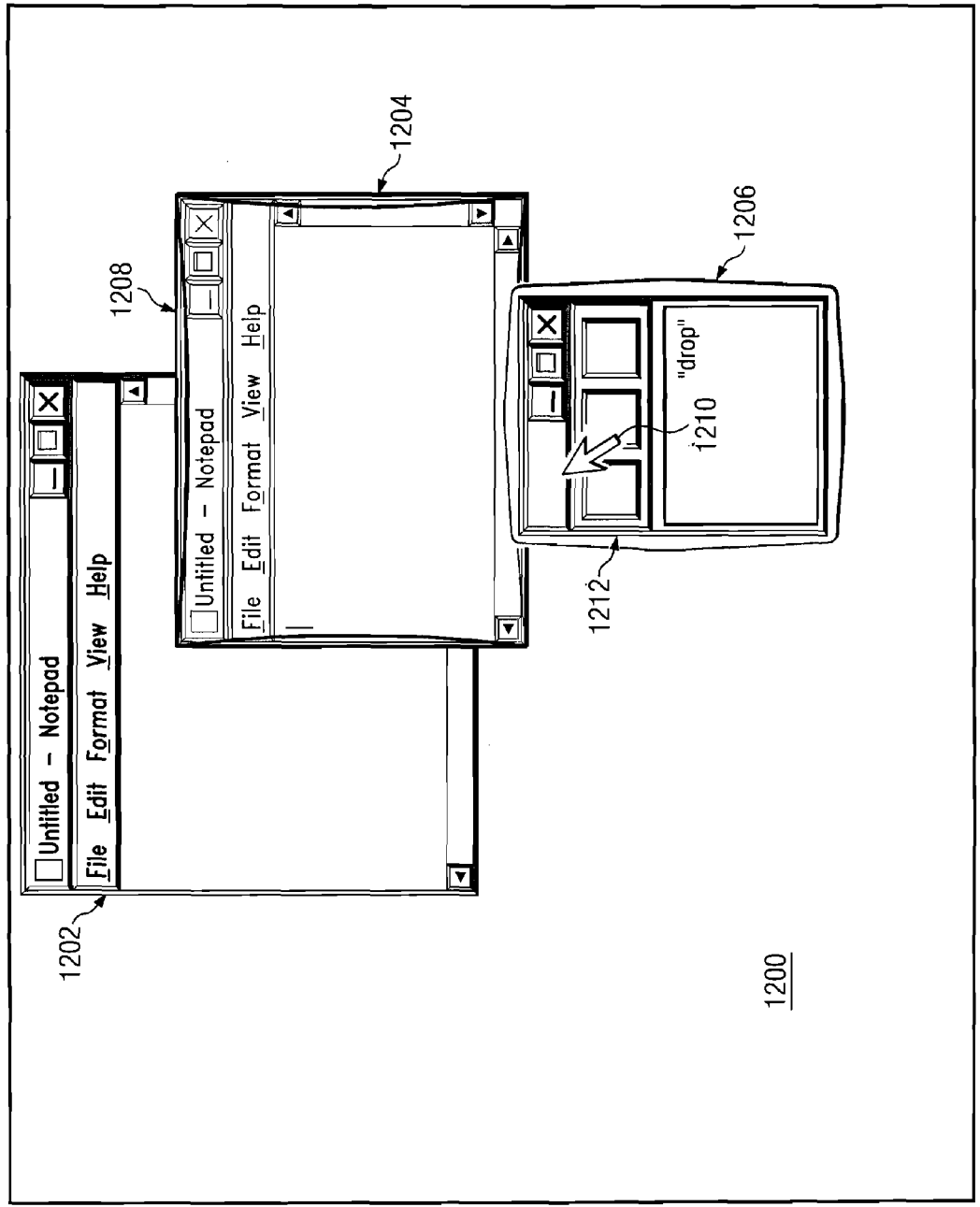

In FIG. 12D, cross hair 1214 is located over window 1204 resulting in dashed outline 1218 appearing around the border of window 1204. This dashed outline indicates that the hot spot for viewport 1208 is over window 1204. In FIG. 12E, chat window 1206 and viewport 1208 have been dropped resulting in viewport 1208 resizing itself to "snap" to window 1204.

Figure 13:
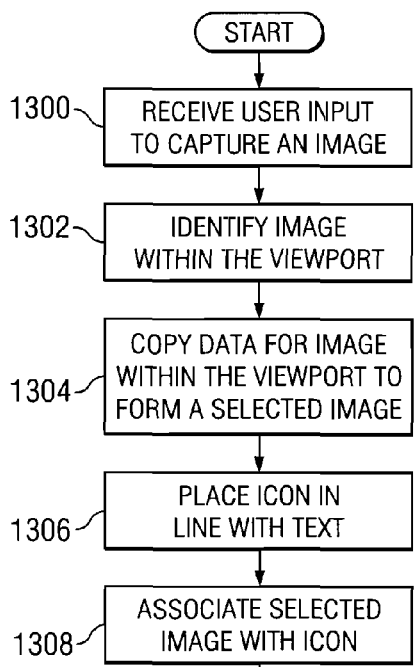
FIG. 13 is a flowchart of a process for capturing an image in accordance with a preferred embodiment of the present invention.

Turning next to FIG. 13, a flowchart of a process for capturing an image is depicted in accordance with a preferred embodiment of the present invention. The process illustrated in FIG. 13 may be implemented in a messaging program, such as messaging program 404 in FIG. 4. In particular, the steps illustrated in this flowchart may be implement within viewport process 408 and messaging program 404.

The process begins by receiving a user input to capture an image (step 1300). The user input for capturing image may be initiated through a selection of a control, such as button 510 in FIG. 5. The image within the viewport is identified (step 1302). The image identified is that portion of a window, image, or screen that is encompassed or covered by a viewport. The data for the image within the viewport is copied to form a selected image (step 1304). A marker in the form of an icon is placed in line with the text (step 1306). If a user is typing text and then initiates a user input to capture an image, the point at which the text stopped is where the marker, the icon in this example, is placed.

Then, the selected image is associated with the icon (step 1308) with the process terminating thereafter. After this point, the message may be sent to another user, resulting in the text and image being sent to that user for presentation.

Figure 14:
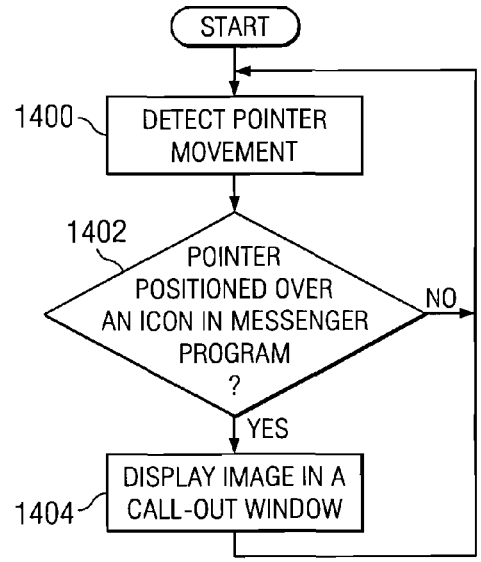
FIG. 14 is a flowchart of a process for displaying an image within a chat window in accordance with a preferred embodiment of the present invention.

With reference next to FIG. 14, a flowchart of a process for displaying an image within a chat window is depicted in accordance with a preferred embodiment of the present invention. The process illustrated in FIG. 14 may be implemented in a messenger program, such as messenger program 404 and in particular within viewport process 408 in FIG. 4.

The process begins by detecting a pointer movement (step 1400). A determination is made as to whether the pointer is positioned over an icon in the messenger program (step 1402). If the pointer is positioned over an icon, the image is displayed in a callout window (step 1404) with the process then returning to step 1400 as described above. With reference again to step 1402, if the pointer is not positioned over an icon in the messenger program, the process then returns to step 1400 without displaying an image. In these examples, the images are displayed in callout windows. Depending on the particular implementation, the image may be displayed using different mechanism, such as a popup window.

Figure 15:
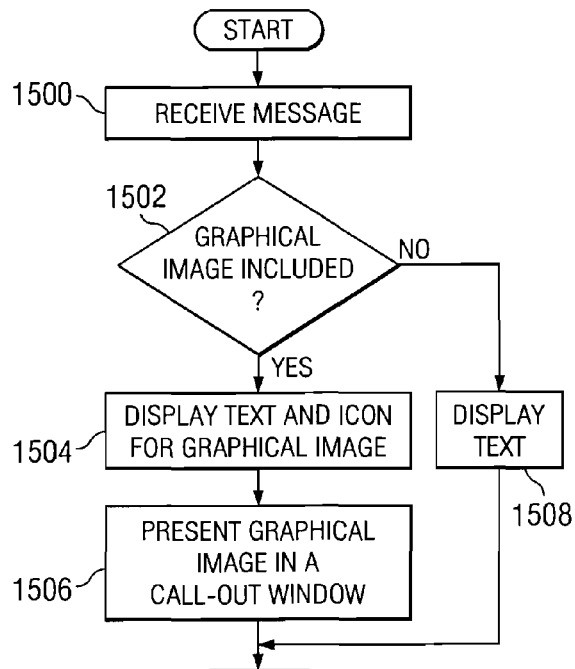
FIG. 15 is a flowchart of a process for receiving and processing messages in accordance with a preferred embodiment of the present invention.

Turning next to FIG. 15, a flowchart of a process for receiving and processing messages depicted in accordance with a preferred embodiment of the present invention. The process illustrated in FIG. 15 may be implemented in a messenger program, such as messenger program 400 in FIG. 4.

The process begins by receiving a message (step 1500). A determination is then made as to whether a graphical image is included with the message (step 1502). If a graphical image is included, the text and an icon for the graphical image is displayed in the messenger program (step 1504). Thereafter, the graphical image is presented in a callout window (step 1506) with the process terminating thereafter. With reference again to step 1502, if a graphical image is not included, the process only displayed texts at 1508 with the process terminating thereafter.

Figure 16:
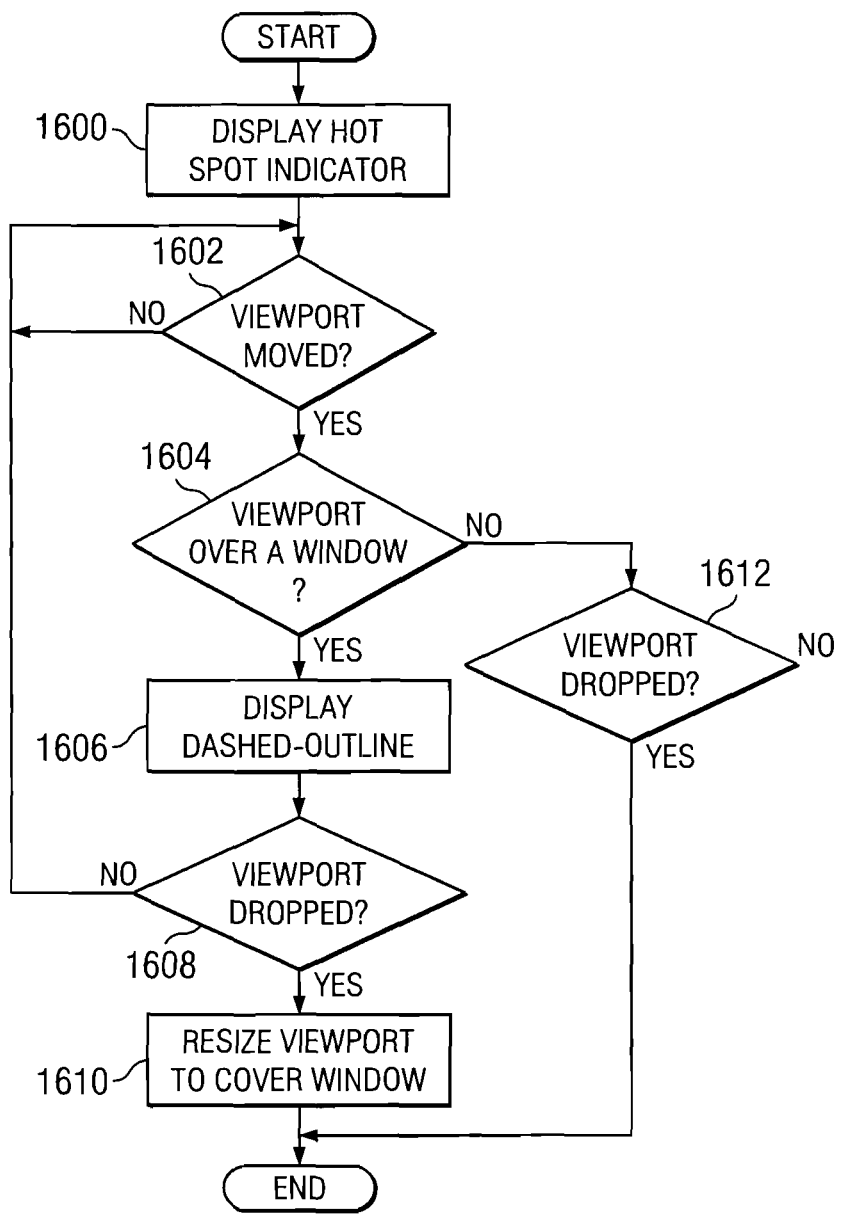
FIG. 16 is a flowchart of a process for a drag and drop feature in accordance with a preferred embodiment of the present invention.

With reference next to FIG. 16, a flowchart of a process for a drag and drop feature is depicted in accordance with a preferred embodiment of the present invention. The process illustrated in FIG. 16 may be implemented in a messenger program, such as messenger program 404. In particular, these steps may be implemented within viewport process 408 in FIG. 4.

The process begins by displaying a hot spot indicator (step 1600) when the viewport has been selected for a drag and drop operation (step 1600). A determination is then made as to whether the viewport has been moved (step 1602). If the viewport has not moved, the process returns to step 1602. Otherwise, a determination is made as to whether the viewport is located over a window (step 1604). If the viewport is located over a window, a dashed outline is displayed around the window (step 1606).

Next, a determination is made as to whether the viewport has been dropped. If the viewport has been dropped, the viewport is resized to cover the window (step 1610) with the process terminating thereafter.

With reference again to step 1608, if the viewport has not been dropped, the process returns to step 1602 as described above. With reference again to step 1604, if the viewport is not over a window, a determination is made as to whether the viewport has been dropped (step 1612). If the viewport has been dropped, the process terminates. Otherwise, the process returns to step 1602 as described above.

Thus, the present invention provides an improved method, apparatus, and computer instructions for managing text and images in a messaging session between users. This mechanism is especially useful for sharing images between instant messaging programs and collaboration tools. The mechanism of the present invention provides a viewport that may be moved and resized to cover various portions of an image within a display, window, or control such as a scroll window. When an image is selected or captured, a marker is placed in the text to indicate the appropriate context for the image.

Through this mechanism, images may be tightly coupled in context with the discussion in the text without the disturbing the flow of a chat session. Additional images may be added to augment the discussion in additional messages as the discussion progresses. Through this mechanism, a need to share an entire application is avoided. Further, cutting and pasting is not needed eliminating additional steps. The additional steps and time needed to email images and wait for those images to collaborate electronically also is avoided.

The mechanism of the present invention provides an efficient tool for capturing a screen area. Further, the text and images may be saved to recreate the session at a later time. With the viewport, defining a specific area to capture and share is easily formed without requiring additional tools to crop images such as those needed in image programs. This mechanism also may be used to capture both still and animations or video.

It is important to note that while the present invention has been described in the context of a fully functioning data processing system, those of ordinary skill in the art will appreciate that the processes of the present invention are capable of being distributed in the form of a computer readable storage device of instructions and a variety of forms. Examples of computer readable storage devices include a floppy disk, a hard disk drive, a RAM, CD-ROMs, and DVD-ROMs. The computer readable storage device may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing messages, the method comprising:
   a computer displaying a viewport on a display, the viewport being adjacent to and in association with a chat window, wherein a region visible through the viewport encompasses an area on the display to be captured;
   the computer controlling, responsive to a user input, the viewport to select the area on the display to be captured as a selected image;
   the computer placing a marker in a text message in the chat window, wherein the marker is associated with the selected image;
   the computer displaying, responsive to detecting movement of a pointer over the marker in the chat window, the selected image at a size that is larger than a size of the marker;
   the computer resizing, responsive to detecting a pointer dragging a side in a plurality of sides of the viewport to a new location, the viewport to include the new location of the side, wherein the plurality of sides of the viewport define a size of the area on the display to be captured by the viewport;
   the computer moving, responsive to a user input, the viewport on the display; and
   the computer resizing, responsive to detecting placement of the viewport over an object on the display, the viewport to encompass the object.

2. The method of claim 1 further comprising:
   the computer sending, responsive to a user input to send the text message, the text message and the image to a target, wherein the text message and the image are displayed at the target.

3. The method of claim 1, wherein the marker is an icon or a thumbnail representation of the image.

4. The method of claim 1, wherein the viewport is attached to the chat window.

5. The method of claim 1, wherein messages, markers in the messages, and images are stored in a log allowing for later review of the log with the images being displayed in proper context with the text.

6. A computer system for managing messages, the computer system comprising:
   one or more processors, one or more computer-readable memories and one or more computer-readable, storage devices, and program instructions, stored on at least one of the one or more storage devices for execution by at least one of the one or more processors via at least one of the one or more memories, the program instructions comprising:
   program instructions to display a viewport on a display, the viewport being adjacent to and in association with a chat window, wherein a region visible through the viewport encompasses an area on the display to be captured;
   program instructions to control the viewport to select the area on the display to be captured as a selected image in response to a user input;
   program instructions to place a marker in a text message in the chat window, wherein the marker is associated with the selected image;
   program instructions to display, responsive to detecting movement of a pointer over the marker in the chat window, the selected image at a size that is larger than a size of the marker;
   program instructions to resize, responsive to detecting a pointer dragging a side in a plurality of sides of the viewport to a new location, the viewport to include the new location of the side, wherein the plurality of sides of the viewport define a size of the area on the display to be captured by the viewport;
   program instructions to move, responsive to a user input, the viewport on the display; and
   program instructions to resize, responsive to detecting placement of the viewport over an object on the display, the viewport to encompass the object.

7. The computer system of claim 6 further comprising:
   program instructions to send, responsive to a user input to send the text message, the text message and the image to a target, wherein the text message and the image are displayed at the target.

8. The computer system of claim 6, wherein the marker is an icon or a thumbnail representation of the image.

9. The computer system of claim 6, wherein the viewport is attached to the chat window.

10. The computer system of claim 6, wherein messages, markers in the messages, and images are stored in a log allowing for later review of the log with the images being displayed in proper context with the text.

11. A computer program product for managing messages, the computer program product comprising:
    one or more non-transitory computer-readable storage devices, and program instructions stored on the storage devices, the program instructions comprising:
    program instructions to display a viewport on a display, the viewport being adjacent to and in association with a chat window, wherein a region visible through the viewport encompasses an area on the display to be captured;
    program instructions to control, responsive to a user input, the viewport to select the area on the display to be captured as a selected image;
    program instructions to place a marker in a text message in the chat window, wherein the marker is associated with the selected image;
    program instructions to display, responsive to detecting movement of a pointer over the marker in the chat window, the selected image at a size that is larger than a size of the marker;
    program instructions to resize, responsive to detecting a pointer dragging a side in a plurality of sides of the viewport to a new location, the viewport to include the new location of the side, wherein the plurality of sides of the viewport define a size of the area on the display to be captured by the viewport;
    program instructions to move, responsive to a user input, the viewport on the display; and
    program instructions to resize, responsive to detecting placement of the viewport over an object on the display, the viewport to encompass the object.

12. A method in a data processing system for managing messages, the method comprising:
    displaying a polygonal-shaped viewport on a display, the viewport being adjacent to and in association with a chat window, wherein a region visible through the viewport encompasses an area on the display to be captured as an image;
    displaying a marker in a text message field in the chat window, wherein the marker indicates an association with the area on the display;

responsive to detecting movement of a pointer by a user over the marker in the chat window, displaying the area of the display at a size that is larger than a size of the marker;

responsive to a user dragging a side of the viewport to a new location, resizing the viewport to include the new location of the dragged side and encompass a corresponding area on the display to be captured by the resized viewport;

responsive to a user input, moving the resized viewport on the display to the new location; and responsive to detecting the new location of the viewport being over an object on the display, resizing the resized viewport to encompass the object.

13. The method according to claim 12, further comprising:
sending, by the one or more processors responsive to a user input to send the text message, the text message and the image to a target, wherein the text message and the image are displayed at the target.

14. The method of claim 12, wherein the marker is a thumbnail representation of the image.

15. The method of claim 12, wherein the viewport is attached to the chat window.

16. The method of claim 12, wherein messages, markers in the messages, and images are stored in a log allowing for later review of the log with the images being displayed in proper context with the text.

17. A computer program product for managing messages, the computer program product comprising:
one or more non-transitory computer-readable storage devices, and program instructions stored on the storage devices, the program instructions comprising:
program instructions to display a polygonal-shaped viewport on a display, the viewport being adjacent to and in association with a chat window, wherein a region visible through the viewport encompasses an area on the display to be captured as an image;
program instructions to display a marker in a text message field in the chat window, wherein the marker indicates an association with the area on the display;
program instructions, responsive to detecting movement of a pointer by a user over the marker in the chat window, to display the area of the display at a size that is larger than a size of the marker;
program instructions, responsive to a user dragging a side of the viewport to a new location, to resize the viewport to include the new location of the dragged side and encompass a corresponding area on the display to be captured by the resized viewport;
program instructions, responsive to a user input, to move the resized viewport on the display to the new location; and
program instructions, responsive to detecting the new location of the viewport being over an object on the display, to resize the resized viewport to encompass the object.

18. A computer system for managing messages, the computer system comprising:
one or more processors, one or more computer-readable memories and one or more computer-readable, storage devices, and program instructions, stored on at least one of the one or more storage devices for execution by at least one of the one or more processors via at least one of the one or more memories, the program instructions comprising:
program instructions to display a polygonal-shaped viewport on a display, the viewport being adjacent to and in association with a chat window, wherein a region visible through the viewport encompasses an area on the display to be captured as an image;
program instructions to display a marker in a text message field in the chat window, wherein the marker indicates an association with the area on the display;
program instructions, responsive to detecting movement of a pointer by a user over the marker in the chat window, to display the area of the display at a size that is larger than a size of the marker;
program instructions, responsive to a user dragging a side of the viewport to a new location, to resize the viewport to include the new location of the dragged side and encompass a corresponding area on the display to be captured by the resized viewport;
program instructions, responsive to a user input, to move the resized viewport on the display to the new location; and
program instructions, responsive to detecting the new location of the viewport being over an object on the display, to resize the resized viewport to encompass the object.

\* \* \* \* \*